US012363384B2

(12) United States Patent
Hiroi et al.

(10) Patent No.: US 12,363,384 B2
(45) Date of Patent: *Jul. 15, 2025

(54) INFORMATION PROCESSING APPARATUS, INFORMATION PROCESSING METHOD, PROGRAM AND INFORMATION PROCESSING SYSTEM

(71) Applicant: Sony Group Corporation, Tokyo (JP)

(72) Inventors: Satoshi Hiroi, Chiba (JP); Yukio Ichikawa, Tokyo (JP); Yumi Sato, Tokyo (JP); Marie Suzuki, Kanagawa (JP); Yasushi Nakajima, Tokyo (JP); Hiroshi Nagatani, Kanagawa (JP); Masahiro Hara, Tokyo (JP); Hiroshi Horiki, Tokyo (JP); Kouhei Fujimoto, Tokyo (JP); Takeshi Matsuzawa, Tokyo (JP); Hiroyuki Mitsubori, Kanagawa (JP); Sakae Houjou, Tokyo (JP); Mingshan Yang, Kanagawa (JP)

(73) Assignee: Sony Group Corporation (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/727,306

(22) Filed: Apr. 22, 2022

(65) Prior Publication Data
US 2022/0248098 A1 Aug. 4, 2022

Related U.S. Application Data

(63) Continuation of application No. 17/145,803, filed on Jan. 11, 2021, now Pat. No. 11,336,962, which is a
(Continued)

(30) Foreign Application Priority Data

May 29, 2008 (JP) .................................. 2008-140994

(51) Int. Cl.
H04N 21/472 (2011.01)
H04L 12/28 (2006.01)
(Continued)

(52) U.S. Cl.
CPC ....... H04N 21/472 (2013.01); H04L 12/2812 (2013.01); H04N 21/4722 (2013.01);
(Continued)

(58) Field of Classification Search
None
See application file for complete search history.

(56) References Cited

U.S. PATENT DOCUMENTS 5,818,439 A 10/1998 Nagasaka et al.
5,883,621 A 3/1999 Iwamura
(Continued)

FOREIGN PATENT DOCUMENTS

CN 1816987 A 8/2006
JP 2004-046789 A 2/2004
(Continued)

OTHER PUBLICATIONS

Office Action from Japanese Application No. 2008-140994, dated Oct. 9, 2012.

Primary Examiner — Benjamin R Bruckart
Assistant Examiner — Charles N Hicks
(74) Attorney, Agent, or Firm — Lerner David LLP

(57) ABSTRACT

An information processing apparatus receives a user selection of content to be reproduced by an external device connected to the information processing apparatus. A request to reproduce the user selected content is sent to the external device. Information indicating whether the external device has started reproducing the selected content is received from the external device. In response to the external device having started reproduction of the selected content, a
(Continued)

thumbnail image is reproduced that corresponds to the content being reproduced by the external device.

17 Claims, 15 Drawing Sheets

Related U.S. Application Data continuation of application No. 15/955,282, filed on Apr. 17, 2018, now Pat. No. 10,965,990, which is a continuation of application No. 15/805,438, filed on Nov. 7, 2017, now Pat. No. 10,771,851, which is a continuation of application No. 15/155,567, filed on May 16, 2016, now Pat. No. 9,843,838, which is a continuation of application No. 13/866,711, filed on Apr. 19, 2013, now Pat. No. 9,380,344, which is a continuation of application No. 12/454,781, filed on May 22, 2009, now Pat. No. 8,443,386.

(51) Int. Cl.
    *H04N 21/4722*      (2011.01)
    *H04N 21/482*      (2011.01)
    *H04N 21/84*      (2011.01)

(52) U.S. Cl.
    CPC ......... *H04N 21/4825* (2013.01); *H04N 21/84* (2013.01); *H04L 2012/2849* (2013.01)

(56) References Cited

U.S. PATENT DOCUMENTS

| | | |
|---|---|---|
| 7,094,962 B2 | 8/2006 | Kayama |
| 7,707,604 B2 | 4/2010 | Kikkoji et al. |
| 7,836,473 B2 | 11/2010 | Tecot et al. |
| 8,090,694 B2 | 1/2012 | Shahraray et al. |
| 8,307,395 B2 * | 11/2012 | Issa ................. H04L 67/1065 |
| | | 725/54 |
| 10,965,990 B2 | 3/2021 | Hiroi et al. |
| 11,336,962 B2 * | 5/2022 | Hiroi ................. H04N 21/4825 |
| 2002/0147984 A1 | 10/2002 | Tomsen et al. |
| 2004/0031058 A1 | 2/2004 | Reisman |
| 2004/0172376 A1 | 9/2004 | Kobori et al. |
| 2005/0015801 A1 | 1/2005 | Hososda et al. |
| 2005/0060741 A1 | 3/2005 | Tsutsui et al. |
| 2005/0071879 A1 | 3/2005 | Haldavnekar et al. |
| 2006/0227632 A1 * | 10/2006 | Koyama ................. G06F 16/48 |
| | | 707/E17.009 |
| 2006/0236333 A1 | 10/2006 | Fujikawa et al. |
| 2007/0006272 A1 | 1/2007 | Kikkoji et al. |
| 2007/0038567 A1 | 2/2007 | Allaire et al. |
| 2007/0157220 A1 | 7/2007 | Cordray et al. |
| 2007/0157281 A1 | 7/2007 | Ellis et al. |
| 2007/0186270 A1 | 8/2007 | Kang et al. |
| 2007/0229651 A1 | 10/2007 | Nakajima |
| 2007/0250859 A1 * | 10/2007 | Ohkita ................. H04N 21/4135 |
| | | 725/89 |
| 2008/0117922 A1 | 5/2008 | Cockrell et al. |
| 2008/0250462 A1 | 10/2008 | Crohas |
| 2008/0271078 A1 | 10/2008 | Gossweiler et al. |
| 2008/0276279 A1 | 11/2008 | Gossweiler et al. |
| 2009/0165046 A1 | 6/2009 | Stallings et al. |
| 2009/0172751 A1 | 7/2009 | Aldrey et al. |
| 2009/0234902 A1 * | 9/2009 | Pilosof .................. G06Q 10/06 |
| | | 709/201 |
| 2009/0265737 A1 | 10/2009 | Issa et al. |
| 2009/0282437 A1 | 11/2009 | Malec et al. |
| 2012/0297421 A1 | 11/2012 | Kim et al. |

FOREIGN PATENT DOCUMENTS

| | | |
|---|---|---|
| JP | 2006166303 A | 6/2006 |
| JP | 3823928 B2 | 7/2006 |
| JP | 2007235571 A | 9/2007 |
| JP | 2008078905 A | 4/2008 |

* cited by examiner

FIG.3A

| CONTENT ID |
|---|
| 1 |
| 2 |
| 3 |

FIG.3B

CACHE DATABASE

| CONTENT ID | 1 |
|---|---|
| TITLE | SEA |
| URL | http://ServerA/1.jpg |
| THUMBNAIL FILE | C:¥Thumbnail¥ServerA_1.jpg |
| DATE/TIME | 2008/7/7 |

| CONTENT ID | 2 |
|---|---|
| TITLE | MOUNTAIN |
| URL | http://ServerA/2.jpg |
| THUMBNAIL FILE | C:¥Thumbnail¥ServerA_2.jpg |
| DATE/TIME | 2008/7/10 |

| CONTENT ID | 3 |
|---|---|
| TITLE | PARK |
| URL | http://ServerB/1.jpg |
| THUMBNAIL FILE | C:¥Thumbnail¥ServerB_1.jpg |
| DATE/TIME | 2008/8/1 |

⋮

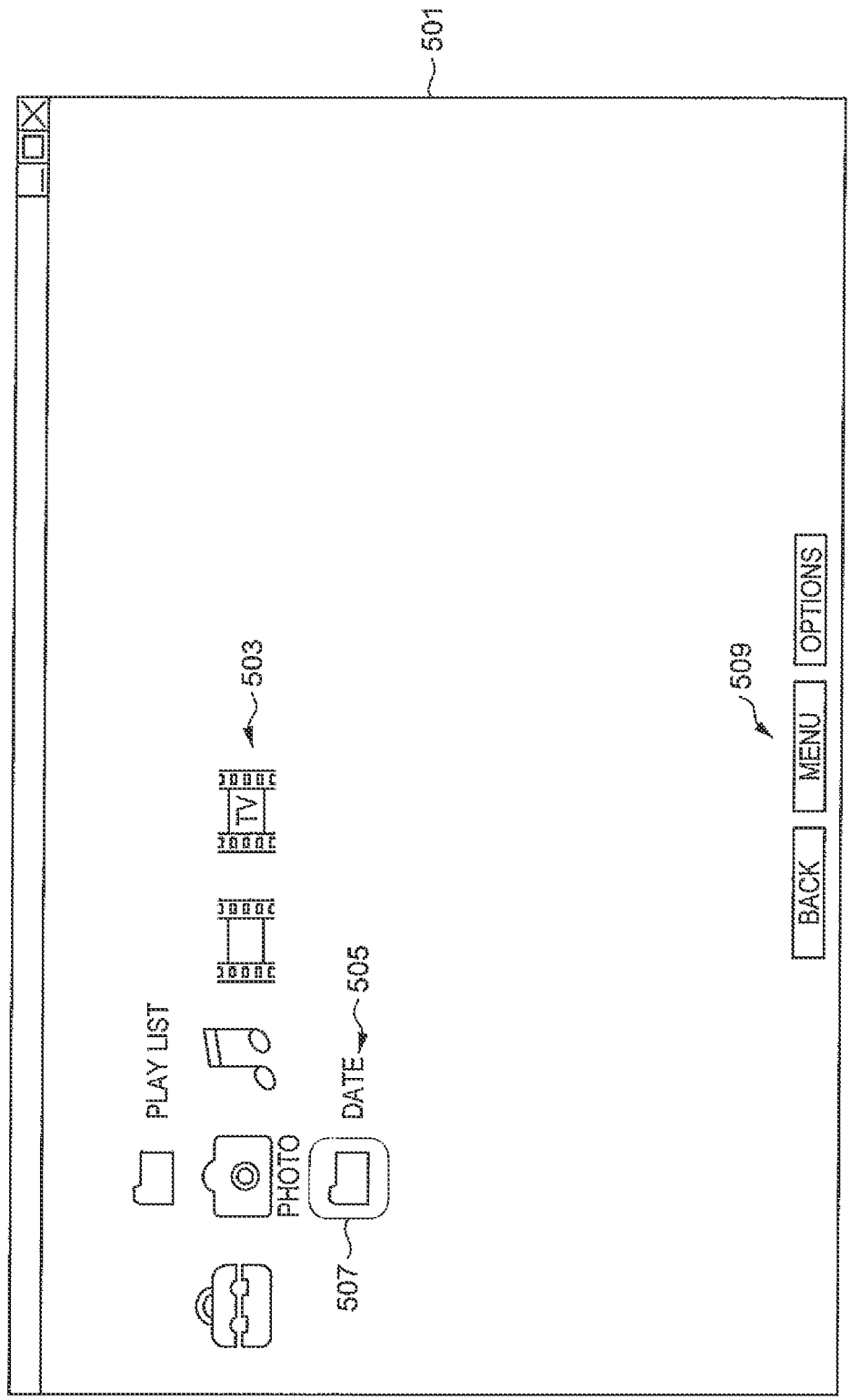

FIG.8

| CONTENT TYPE | FIRST LAYER | SECOND LAYER | THIRD LAYER |
|---|---|---|---|
| PHOTO | DATE | YEAR/MONTH | ITEM |
| | | ALL | ITEM |
| | PLAY LIST | PLAY LIST NAME | ITEM |
| MUSIC | AUTOMATIC CHANNEL | AUTOMATIC CHANNEL NAME | — |
| | PLAY LIST | PLAY LIST NAME | ITEM |
| | ALBUM | ALBUM NAME | ITEM |
| | | ALL | ITEM |
| | ARTIST | ARTIST NAME | ITEM |
| | | ALL | ITEM |
| | GENRE | GENRE NAME | ITEM |
| | | ALL | ITEM |
| | RELEASE YEAR (AGE) | RECENT | ITEM |
| | | NINETIES | ITEM |
| | | EIGHTIES | ITEM |
| | | SEVENTIES | ITEM |
| | | PAST | ITEM |
| | | ALL | ITEM |
| VIDEO | DATE | YEAR/MONTH | ITEM |
| | | ALL | ITEM |
| | PLAY LIST | PLAY LIST NAME | ITEM |
| VIDEO (TV RECORDING) | RECORDED VIDEO | YEAR/MONTH | ITEM |
| | | ALL | ITEM |
| | CHANNEL | CHANNEL NAME | ITEM |
| | | ALL | ITEM |
| | GENRE | GENRE NAME | ITEM |
| | | ALL | ITEM |
| | VIEWING STATE | NOT VIEWED | ITEM |
| | | ALL | ITEM |
| | PLAY LIST | PLAY LIST NAME | ITEM |

INFORMATION PROCESSING APPARATUS, INFORMATION PROCESSING METHOD, PROGRAM AND INFORMATION PROCESSING SYSTEM

CROSS-REFERENCE TO RELATED APPLICATIONS

The present application is a continuation of U.S. patent application Ser. No. 17/145,803, filed Jan. 11, 2021, which is a continuation of U.S. patent application Ser. No. 15/955,282, filed Apr. 17, 2018, issued as U.S. Pat. No. 10,965,990, which is a continuation of U.S. patent application Ser. No. 15/805,438, filed Nov. 7, 2017, issued as U.S. Pat. No. 10,771,851, which is a continuation of U.S. patent application Ser. No. 15/155,567, filed May 16, 2016, issued as U.S. Pat. No. 9,843,838, which is a continuation of U.S. patent application Ser. No. 13/866,711, filed Apr. 19, 2013, issued as U.S. Pat. No. 9,380,344, which is a continuation of U.S. patent application Ser. No. 12/454,781, filed May 22, 2009, issued as U.S. Pat. No. 8,443,386, which claims priority from Japanese Patent Application No. JP 2008-140994 filed in the Japanese Patent Office on May 29, 2008, all of which are hereby incorporated by reference herein.

BACKGROUND OF THE INVENTION

Field of the Invention

The present invention relates to an information processing apparatus, an information processing method, a program, and an information processing system.

Description of the Related Art

With widespread use of data communication networks nowadays, a so-called home network enabling communication between devices by connecting household appliances, computers, and other peripherals to a network is finding its way also into the home. In a home network, convenience and comfort are provided to users such as sharing a data processing function of each device and transmission/reception of content between devices by performing communication between network connected devices and increasing use thereof is expected in the future.

In a system described in JP3823929, for example, after content being shared between server and client devices, the client device acquires content from the server to reproduce the content.

SUMMARY OF THE INVENTION

However, there is an issue that it is difficult for a novice to build a home network because it becomes frequently necessary to use professional expertise in order to build a home network as described above using various devices such as server and client devices.

Thus, the present invention has been made in view of the above issue and it is desirable to provide a novel and improved information processing apparatus enabling easy construction of a home network without professional expertise, an information processing method, a program, and an information processing system.

According to an embodiment of the present invention, there is provided an information processing apparatus, including a content information acquisition unit that acquires content related information related to content data managed by a content management server from the content management server managing the content data, a selection unit that selects content from a content list which is a list of the content based on the content related information, and an externally connected device control unit that notifies, when the selected content is executed by an externally connected device connected externally, the externally connected device of location information of content data corresponding to the selected content and acquires reproduction state information representing a reproduction state of content when the externally connected device reproduces the selected content from the externally connected device.

According to the above configuration, the content information acquisition unit acquires content related information related to content managed by a content management server from the content management server managing the content. Moreover, the externally connected device control unit notifies, when selected content is executed by an externally connected device connected externally, the externally connected device of location information of content data corresponding to the selected content and acquires content reproduction state information representing a reproduction state of content when the externally connected device reproduces the selected content from the externally connected device.

The content information acquisition unit may acquire the content data and the information processing apparatus may further include a content list generation unit that generates a content list, which is a list of the content, based on the content related information.

The information processing apparatus may further include a content reproduction processing unit that performs reproduction processing of content to reproduce the content data selected from the content list.

The information processing apparatus may further include a storage unit that stores thumbnail information containing information about a thumbnail of the content, wherein the content reproduction processing unit reproduces, when the selected content is reproduced by the externally connected device, the thumbnail information corresponding to the content being reproduced by the externally connected device by acquiring the thumbnail information from the storage unit.

The externally connected device control unit may control switching of the content being reproduced by the externally connected device based on content reproduction state information acquired from the externally connected device.

The content reproduction processing unit may switch the thumbnail information being reproduced based on content reproduction state information acquired from the externally connected device.

Video content may be associated with time information and frame images of characteristic scenes of the video content as metadata and the content reproduction processing unit may display the frame images associated as the metadata based on a content reproduction state acquired from the externally connected device and the metadata.

When the content is being reproduced by the content reproduction processing unit and while the content being reproduced, the content being reproduced should be switched to be reproduced by the externally connected device, the externally connected device control unit may transmit information indicating a reproducing point of the content being reproduced to the externally connected device to cause the externally connected device to synchronize with the reproducing point based on information indicating the reproducing point.

The externally connected device control unit may notify the externally connected device of a reproduction list of content to be reproduced by the externally connected device for each type of the content to cause the externally connected device to reproduce the content by linking the reproduction list of the different content types.

According to another embodiment of the present invention, there is provided an information processing method, including the steps of acquiring content related information related to content data managed by a content management server from the content management server managing the content data, selecting content from a content list which is a list of the content based on the content related information, and notifying, when the selected content is executed by an externally connected device connected externally, the externally connected device of location information of content data corresponding to the selected content; and acquiring reproduction state information representing a reproduction state of content when the externally connected device reproduces the selected content from the externally connected device.

The information acquisition step may acquire the content data and the information processing method may further include the steps of: generating a content list, which is a list of the content, based on the content related information and performing reproduction processing of content to reproduce the content data selected from the content list.

According to another embodiment of the present invention, there is provided a program that causes a computer connectable to a content management server managing content and an externally connected device to realize a content information acquisition function that acquires content related information related to content managed by the content management server from the content management server, a content list generation function that generates a content list, which is a list of the content that can be viewed, based on the acquired content related information, a content reproduction processing function that reproduces the content selected from the content list, and an externally connected device control function that notifies, when the selected content is executed by an externally connected device connected externally, the externally connected device of location information of content data corresponding to the selected content and acquires content reproduction state information representing a reproduction state of content when the externally connected device reproduces the selected content from the externally connected device.

According to the above configuration, a computer program causes, by being executed after being stored in a storage unit provided with a computer and read into a CPU provided with the computer, the computer to function as the above information processing apparatus. A computer readable recording medium in which the computer program is stored can also be provided. The recording medium includes a magnetic disk, optical disk, magneto-optical disk, and flash memory. The computer program may also be delivered via, for example, a network without using any recording medium.

According to another embodiment of the present invention, there is provided an information processing system, including a content management server that manages content, an information processing apparatus, including a content information acquisition unit that acquires content related information related to content managed by the content management server and content data corresponding to the content, a selection unit that selects content from a content list which is a list of the content based on the content related information, and an externally connected device control unit that notifies, when the selected content is executed by an externally connected device connected externally, the externally connected device of location information of content data corresponding to the selected content and acquires content reproduction state information representing a reproduction state of content when the externally connected device reproduces the selected content from the externally connected device, and a renderer apparatus, including a content data acquisition unit that acquires the content data from the content management server based on location information of the content data notified from the information processing apparatus and a content reproduction processing unit that reproduces the acquired content data.

According to the embodiments of the present invention described above, a home network can be built without relying on professional expertise.

BRIEF DESCRIPTION OF THE DRAWINGS

FIG. 3A is an explanatory view illustrating a reproduction list generated by the information processing apparatus according to the first embodiment;

FIG. 3B is an explanatory view exemplifying a database held by the information processing apparatus according to the first embodiment;

FIG. 7 is an explanatory view illustrating a concrete example of the information processing method according to the first embodiment;

FIG. 8 is an explanatory view illustrating examples of hierarchical containers set for each type of content;

DETAILED DESCRIPTION

Figure 1:
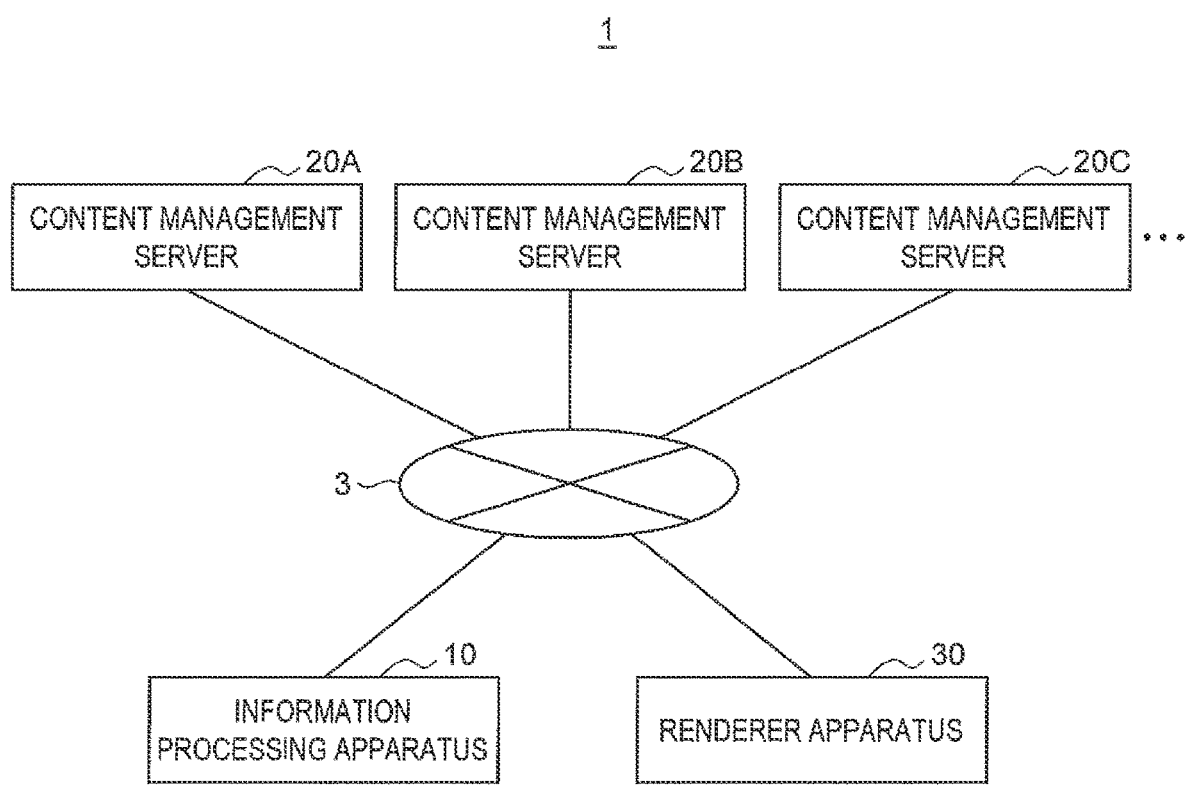
FIG. 1 is an explanatory view illustrating an information processing system according to a first embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

<Description of a Home Network>

Figure 15A:
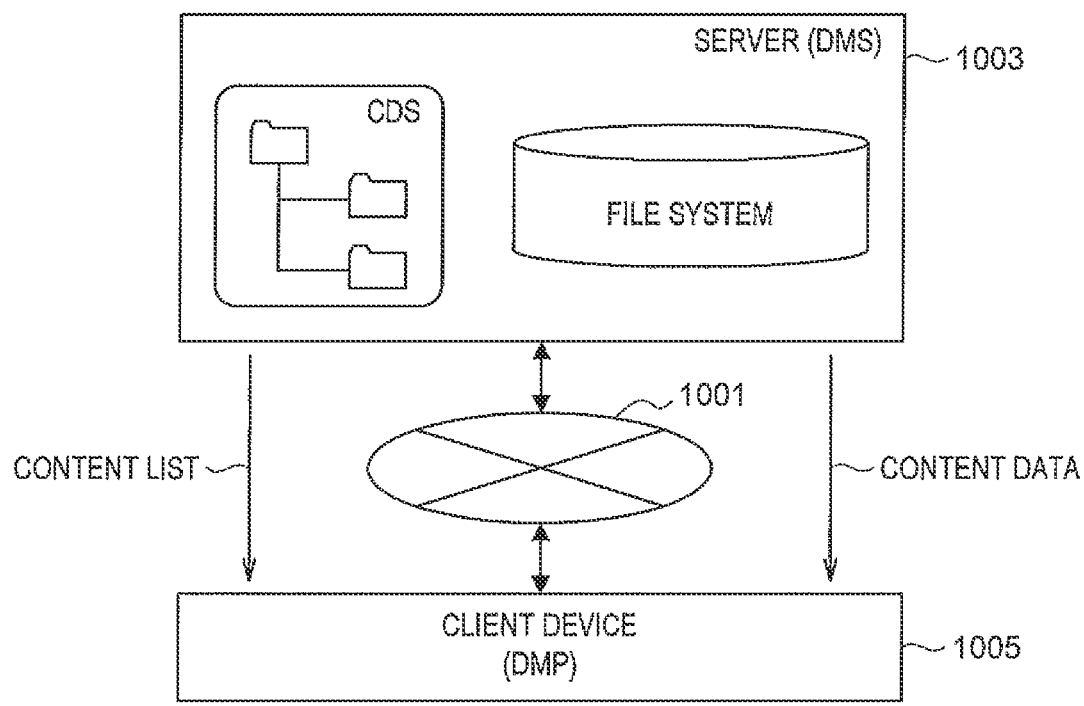
FIG. 15A is an explanatory view illustrating a sharing method and a reproduction method of content in a home network.
Figure 15B:
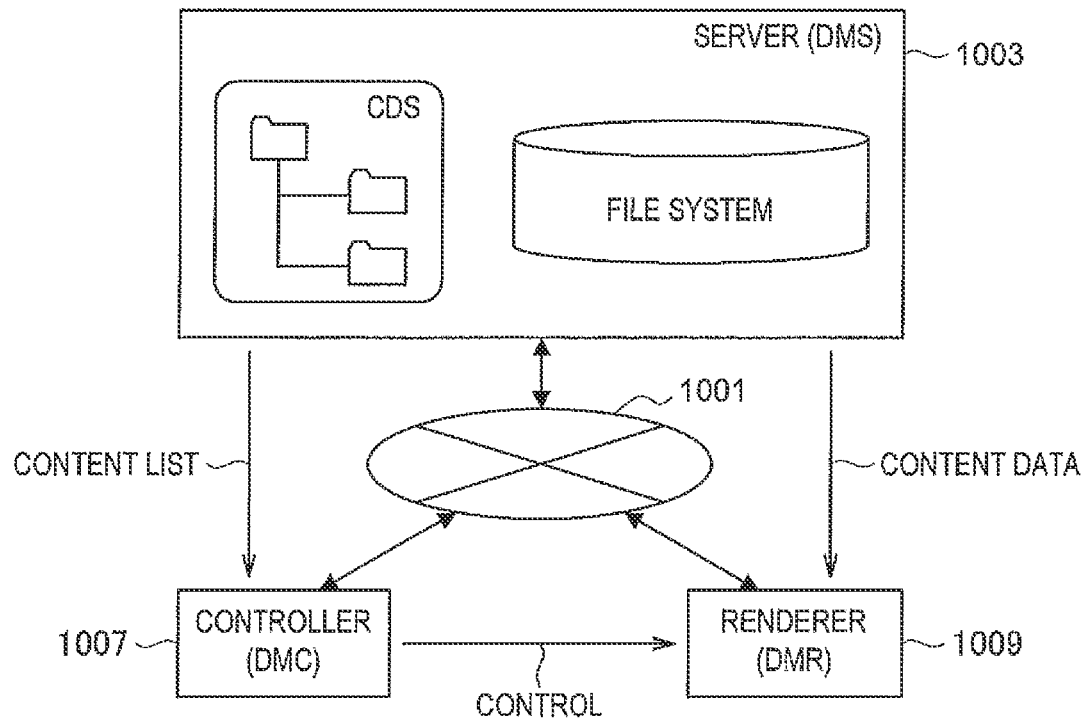
FIG. 15B is an explanatory view illustrating the sharing method and the reproduction method of content in the home network.

First, before describing an information processing system and an information processing apparatus according to each embodiment of the present invention, the sharing method and the reproduction method of content in a home network currently proposed will briefly be described with reference to FIGS. 15A and 15B. FIGS. 15A and 15B are explanatory views illustrating the sharing method and the reproduction method of content in a home network.

Currently, DLNA (Digital Living Network Alliance) is known as a standard for building a home network using AV equipment, personal computers, mobile devices and the like.

According to the DLNA guideline, content such as photos, music, and video is stored in a device called a digital media server (DMS) 1003 and a content list is managed in a structure having a folder hierarchy called a content directory (Content Directory Service: CDS). An ID value to uniquely identify each piece of content and a URL from which metadata and content data, which are detailed information of content, can be acquired are attached to each piece of content in the CDS. The CDS is released to other devices in a home network 1001, and a digital media player (DMP) 1005, which is a client device to reproduce content, selects content by navigating through the CDS on the DMS and acquires content data indicated by the URL from the digital media server 1003 to reproduce the content. Here, an HTTP is used as a protocol used for communication (for example, mutual communication for list acquisition and content data acquisition) between the DMS 1003 and the DMP 1005. A communication model shown in FIG. 15A to realize content sharing/reproduction constituted by the DMS 1003 and the DMP 1005 is called a 2-Box model.

The DLNA guideline also provides a device 1009 called renderer (Digital Media Renderer: DMR) dedicated to reproduction of content designated by other devices without navigating through the content list actively per se. When the URL of content to be reproduced is notified, the DMR 1009 acquires content data indicated by the URL in the same manner as the DMP 1005 using the HTTP and reproduces the content. A device that performs operations such as designation, reproduction, stop, and seeks of content on the DMR 1009 is called a controller (Digital Media Controller: DMC) 1007. The DMC 1007 generally has a function to select content by navigating through the CDS on the DMS 1003. A communication model of content sharing/reproduction constituted by the DMS/DMC/DMR shown in FIG. 15B is called a 3-Box model.

Devices such as the DMS/DMP/DMC/DMR are conceptual devices classified based on functions of each of devices and thus may not correspond to physical hardware one-to-one. Moreover, communication between devices is performed by using a protocol (for example, TCP/UDP and HTTP/SOAP) assembled on the basis of IPv4 and thus hardware implementing each device is assumed to have a communication function (typically, Ethernet, wireless LAN and the like) capable of operating the Internet Protocol (IP).

First Embodiment

<Information Processing System>

First, an information processing system according to the first embodiment of the present invention will be described in detail with reference to FIG. 1. FIG. 1 is an explanatory view illustrating an information processing system according to the present embodiment.

An information processing system 1 according to the present embodiment includes, for example, as shown in FIG. 1, a communication network 3, an information processing apparatus 10, content management servers 20A to 20C, and a renderer apparatus 30.

The communication network 3 is a communication line network that bi-directionally communicably or uni-directionally communicably connects the information processing apparatus 10, the content management servers 20A to 20C, and the renderer apparatus 30. The communication network is constituted, for example, by a public network such as the Internet, a telephone line network, satellite communication network, and simultaneous communication channel, or a leased line network such as a WAN (Wide Area Network), LAN (Local Area Network), IP-VPN (Internet Protocol-Virtual Private Network), Ethernet (registered trademark), and wireless LAN and it does not matter whether the line network is by wire or by radio.

The information processing apparatus 10 is an apparatus capable of reproducing content such as video content, music content, and photo content by acquiring such content from the content management server 20 described later. The information processing apparatus 10 may also be a computer apparatus such as a personal computer and server, or an information home appliance having a communication function via a network such as a TV receiver, DVD/HDD recorder, mobile phone, PDA (Personal Digital Assistant), digital camera, home video game machine, and digital video camera. The information processing apparatus 10 may also be a portable device that can be carried by a subscriber such as a portable game machine, PHS, and portable video/sound player. The information processing apparatus 10 also has functions of a digital media player (DMP) and a digital media controller (DMC) conforming to the DLNA (Digital Living Network Alliance) guideline. Further, the information processing apparatus 10 also has a function of a digital media server (DMS). The information processing apparatus 10 according to the present embodiment has both functions of the DMS and DMP and thus can manage content and the information processing apparatus 10 itself can reproduce content. Further, the information processing apparatus 10 according to the present embodiment also has a function of the DMC and thus can control the renderer apparatus 30. As a result, a user of the information processing apparatus 10 according to the present embodiment can easily build a home network without having professional expertise in the home network.

The content management servers 20A to 20C manage content such as video content, music content, and photo content by associating the content with location information or metadata of the content. The content management servers 20A to 20C also provide content and metadata of content managed by the content management server 20 in response to requests from the information processing apparatus 10 and the renderer apparatus 30 connected via the communication network 3. The content management servers 20A to 20C may be a computer apparatus such as a personal computer and server, or an information home appliance having a communication function via a network such as a TV receiver, DVD/HDD recorder, mobile phone, PDA (Personal Digital Assistant), digital camera, home video game machine, and digital video camera. The content management servers 20A to 20C may also be a portable device that can be carried by a subscriber such as a portable game machine, PHS, and portable video/sound player. The content management servers 20A to 20C have a function of the digital media server (DMS) conforming to the DLNA guideline.

The renderer apparatus 30 is an apparatus that acquires content data corresponding to content designated by the information processing apparatus 10 from the content management servers 20A to 20C to reproduce the content. The renderer apparatus 30 may be a computer apparatus such as a personal computer and server, or an information home appliance having a communication function via a network such as a TV receiver, DVD/HDD recorder, mobile phone, PDA (Personal Digital Assistant), digital camera, home video game machine, and digital video camera. The renderer apparatus 30 may also be a portable device that can be carried by a subscriber such as a portable game machine, PHS, and portable video/sound player. The renderer apparatus 30 has a function of a digital media renderer (DMR) conforming to the DLNA guideline.

In the example shown in FIG. 1, only one unit of each of the information processing apparatus 10 and the renderer apparatus 30 is connected to the communication network 3, but a plurality of units of each of the information processing apparatus 10 and the renderer apparatus 30 may be connected to the communication network 3. Similarly, in the example shown in FIG. 1, three units of the content management servers 20A to 20C are connected, but one or two units of the content management server 20 may be connected to the communication network 3, or four or more units of the content management server 20 may be connected.

In the example shown in FIG. 1, the information processing apparatus 10, the content management server 20, and the renderer apparatus 30 are mutually connected via the communication network 3, but the information processing apparatus 10 and the content management server 20 may directly be connected without going through the communication network 3.

The information processing apparatus 10 will be described in detail below again.

<Configuration of the Information Processing Apparatus>

Figure 2:
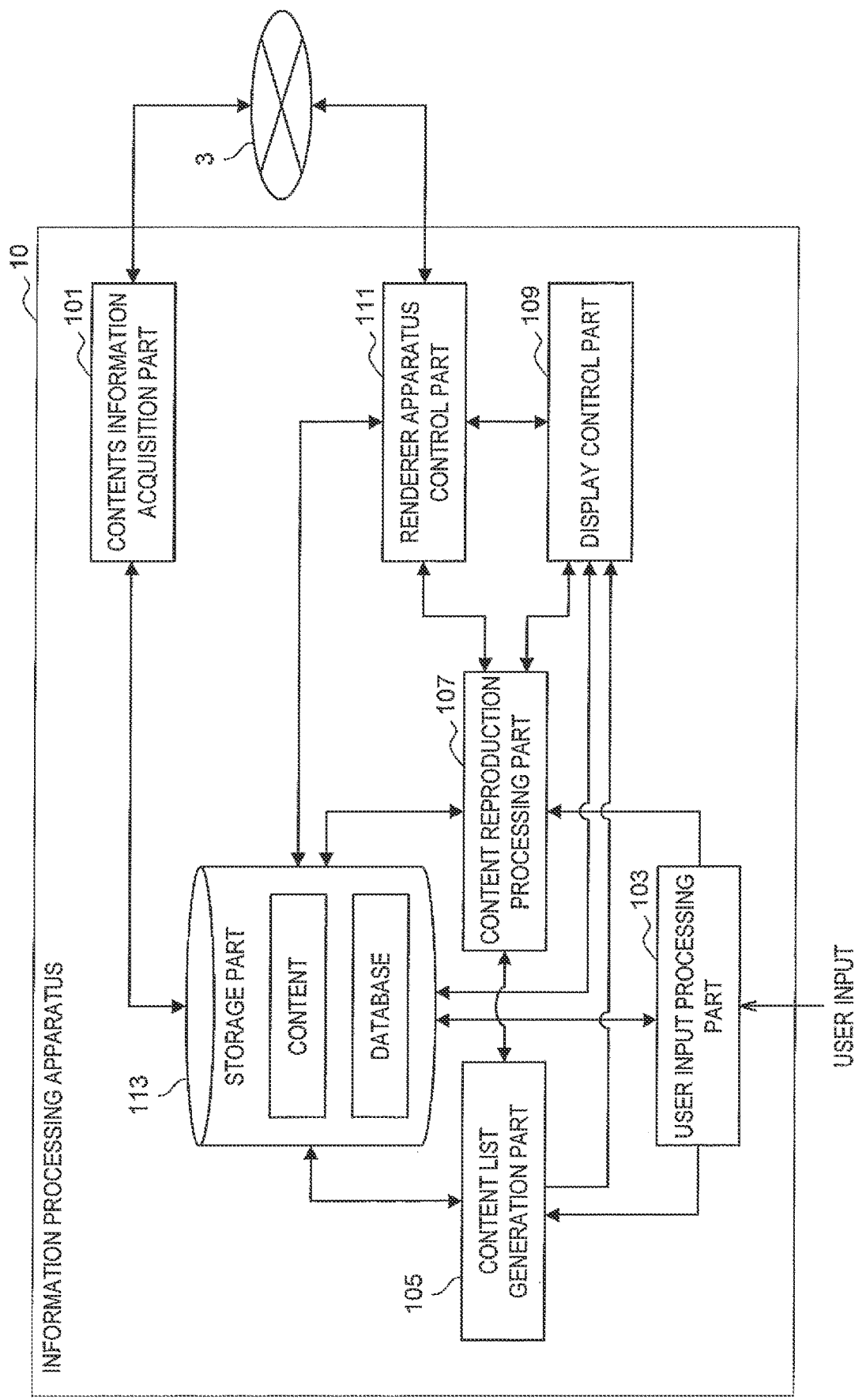
FIG. 2 is a block diagram illustrating a configuration of an information processing apparatus according to the first embodiment.

Subsequently, the configuration of the information processing apparatus 10 according to the present embodiment will be described in detail with reference to FIG. 2. FIG. 2 is a block diagram illustrating the configuration of the information processing apparatus 10 according to the present embodiment.

The information processing apparatus 10 according to the present embodiment mainly includes, as shown, for example, in FIG. 2, a content information acquisition unit 101, a user input processing unit 103, a content list generation unit 105, a content reproduction processing unit 107, a display control unit 109, a renderer apparatus control unit 111, and a storage unit 113.

The content information acquisition unit 101 is constituted, for example, by a CPU (Central Processing Unit), ROM (Read Only Memory), RAM (Random Access Memory), and a communication apparatus. The content information acquisition unit 101 acquires content information related to content managed by the content management server 20 from the content management server 20 that can be connected via the communication network 3. Here, content information related to content includes, for example, location information of content data corresponding to content, metadata of content, and content data itself.

Here, metadata of content is attribute information about contents of content such as the date, play list, channel, genre, and viewing state and includes at least metadata provided, for example, in the DLNA guideline. Location information of content data includes, for example, an ID for managing content and URL (Uniform Resource Identifier) of content.

Content information acquired by the content information acquisition unit 101 is recorded in the storage unit 113 described later. The content information acquisition unit 101 may directly transmit acquired content data to the content list generation unit 105 and the content reproduction processing unit 107.

Here, the content information acquisition unit 101 can record content data acquired from the content management server 20, content data directly installed in the information processing apparatus 10 and the like in the storage unit 113 described later after creating a predetermined CDS in accordance with metadata associated with the content data.

Further, the content information acquisition unit 101 can acquire, for example, data on a jacket cover photo of an album, which is a collection of music content, trailers of video content, and thumbnails of video content, photo content and the like from the content management server 20 as content information. Here, a thumbnail of content shows still pictures representing a title of content, details of content and the like.

The content information acquisition unit 101 can acquire the content information from the content management server 20 in advance in any timing, for example, when the information processing apparatus 10 itself is started, the content management server 20 connected to the communication network 3 is started, or the information processing apparatus 10 is connected to the content management server 20 to record the content information in the storage unit 113 as a cache.

The user input processing unit 103 is constituted, for example, by a CPU, ROM, RAM, and communication apparatus. When content or the like displayed in a display unit (not shown) provided with the information processing apparatus 10 according to the present embodiment is selected by the user, the user input processing unit 103 generates a processing start signal corresponding to the selected content to request the corresponding processing unit to start processing.

If, for example, the user of the information processing apparatus 10 selects processing to generate a list of content that can be viewed by the information processing apparatus 10, the user input processing unit 103 generates a processing start signal corresponding to the selected processing content to request the content list generation unit 105 described later to start to generate a content list.

If the user of the information processing apparatus 10 selects to view specific content based on contents of a content list, the user input processing unit 103 generates a processing start signal indicating that content viewing is selected to request the content information acquisition unit 101 to acquire content data.

User input done into the user input processing unit 103 may be done by an object such as an icon displayed in the display unit (not shown) of the information processing apparatus 10 being selected by the user using a position determination object such as a mouse pointer and cursor.

User input may also be done by a command or the like being input by the user through an input apparatus such as a keyboard provided in the information processing apparatus 10. Further, user input may be various signals transmitted from a digital media controller (DMC) conforming to the DLNA guideline.

The content list generation unit 105 is constituted, for example, by a CPU, ROM, and RAM. The content list generation unit 105 generates a content list, which is a list of content viewable by the information processing apparatus 10, based on content information acquired by the content information acquisition unit 101. More specifically, the content list generation unit 105 generates a content list in which viewable content is listed by referencing, for example, the latest content information recorded in the storage unit 113 described later. A thumbnail corresponding to each piece of content may also be displayed in the content list together with a content title and the like.

The content list may also be displayed in such a way that content managed by the content management server 20 in an operating state and that managed by the content management server 20 in a non-operating state are distinguishable. For example, the content management server 20 can be displayed by distinguishing the operating state thereof by displaying the thumbnail, title and the like of content managed by the server 20 in a non-operating state darker than normal brightness such as the grayout display while displaying the thumbnail, title and the like of content managed by the server 20 in an operating state in normal brightness.

A content list described above is generated without explicitly indicating which content is being managed by which content management server 20. Thus, the user of the information processing apparatus 10 may feel as if content displayed in a content list is managed by one unit of the content management server. With such a content list being generated, the user of the information processing apparatus 10 can know viewable content without grasping by which server the content is being managed.

The content reproduction processing unit 107 is constituted, for example, by a CPU, ROM, and RAM, and performs reproduction processing of content data transmitted from the content information acquisition unit 101, that stored in the storage unit 113 and the like. The content reproduction processing unit 107 can use data and databases recorded in the storage unit 113 described later.

More specifically, when a processing start signal indicating that content has been selected is notified by the user input processing unit 103, the content reproduction processing unit 107 first generates a reproduction list, which is a list of content to be reproduced.

The reproduction list generated by the content reproduction processing unit 107 has content selected by the user from the content list listed therein and has at least the identification number (ID) in a database uniquely allocated to the selected content. FIG. 3A is an example of the reproduction list when three pieces of content are selected by the user. As shown in FIG. 3A, the reproduction list has IDs allocated to the user-selected content.

Content information acquired by the content information acquisition unit 101 is recorded in the storage unit 113 described later in a form of database as shown, for example, in FIG. 3B. That is, at least the ID value (content ID) uniquely allocated to content, title attached to the content, URL indicating the location of content data, URL indicating the location of a thumbnail of cached content, and date/time information are recorded as metadata in a database recorded in the storage unit 113.

Each processing unit of the information processing apparatus 10 can know the location where content data is present (in other words, in which position of which content management server 20 content data is present), the location of cache information stored in the information processing apparatus 10 and the like by referencing the database when necessary.

In the example shown in FIG. 3B, a database about photo content is shown, but similar databases are stored in the storage unit 113 about other types of content such as music content and video content. Items of the database shown in FIG. 3B are only an example and other items that are not shown in the figure may also be present in a database.

Next, the content reproduction processing unit 107 determines whether user input indicates that selected content is to be reproduced by the information processing apparatus 10 or by the renderer apparatus 30, which is an externally connected device connected to the information processing apparatus 10.

If the signal transmitted from the user input processing unit 103 is a signal indicating that content is to be reproduced by the information processing apparatus 10, the content reproduction processing unit 107 requests the content information acquisition unit 101 to acquire content data based on location information (that is, the URL) of the content data described in the generated reproduction list. When acquisition of the content data is completed, the content reproduction processing unit 107 outputs the content data acquired by the content information acquisition unit 101 to the display control unit 109. If, in this case, the acquired content data is encoded, the content reproduction processing unit 107 may output decoded content to the display control unit 109 while decoding content data or output content data to the display control unit 109 after decoding is completed.

For example, the content reproduction processing unit 107 acquires content information in the order of a reproduction list from a database recorded in the storage unit 113 described later, the content information acquisition unit 101 receives content data by connecting to the URL from which the content data is acquired using the HTTP, and the display control unit 109 displays the received data in a screen. The content reproduction processing unit 107 can realize a slideshow by automatically processing items in a list at regular intervals (slideshow display switching time).

When content selected by the user is reproduced by the information processing apparatus 10 in this manner, the information processing apparatus 10 according to the present embodiment functions as a DMP following the DLNA guideline.

If, on the other hand, the signal transmitted from the user input processing unit 103 is a signal indicating that content is to be reproduced by an externally connected device (for example, the renderer apparatus 30) connected externally to the information processing apparatus 10, the content reproduction processing unit 107 outputs the generated reproduction list to the renderer apparatus control unit 111 described later for a notification to the renderer apparatus 30 that reproduces content via the renderer apparatus control unit 111. At this point, the content reproduction processing unit 107 determines the types of content reproducible by the designated renderer apparatus 30 based on renderer apparatus attribute information notified from the renderer apparatus control unit 111 described later. If there is content that is not reproducible by the designated renderer apparatus 30 in the reproduction list of which the renderer apparatus 30 is notified, the content reproduction processing unit 107 may delete the ID corresponding to the applicable content before transmitting the changed reproduction list or stop transmission of the reproduction list to prompt the user to change the selection of content.

When reproduction of content by the renderer apparatus 30 is started, the content reproduction processing unit 107 accesses a database recorded in the storage unit 113 based on the ID value described in the reproduction list to acquire location information of a thumbnail file recorded in the database. Subsequently, the content reproduction processing unit 107 notifies the content information acquisition unit 101 of the acquired location information and the content information acquisition unit 101 acquires cache information of the thumbnail from the storage unit 113 based on the notified location information. When acquisition of cache information of the thumbnail is completed, the content reproduction processing unit 107 outputs the acquired cache information of the thumbnail to the display control unit 109.

When content selected by the user is reproduced by the renderer apparatus 30 in this manner, the information processing apparatus 10 according to the present embodiment functions as a DMC following the DLNA guideline.

There may be cases in which an apparatus reproducing content is switched while the content being reproduced and the information processing apparatus 10 according to the present embodiment can easily switch the reproducing apparatus also in such cases. For example, when reproduction by the information processing apparatus 10 is switched to that by the renderer apparatus 30, the content reproduction processing unit 107 can realize the switching by transmitting the URL of content data to the renderer apparatus 30 via the renderer apparatus control unit 111 based on the reproduction list used for reproduction.

When content is reproduced in the form of streaming from the content management server 20, instead of reproduction after all content data being downloaded to the information processing apparatus 10, it is preferable to transmit a reproduction request to the renderer apparatus 30 after stopping data streaming with the content management server 20.

If content is still picture content such as photo content, no issue will be caused even if the reproducing apparatus is switched while the content being reproduced, but if content is such content that changes with time such as music content and video content, there is a possibility that a portion already viewed needs to be viewed again if the reproducing apparatus is switched at some midpoint of some content. Thus, if content being reproduced is such content that changes with time, the content reproduction processing unit 107 preferably transmits content data by attaching identification information (in other words, identification information indicating the reproducing point in content) indicating the position being reproduced (for example, the temporal position such as having been reproduced up to 0 min, A sec or the amount of data already reproduced). With such identification information being transmitted to the renderer apparatus 30 by the renderer apparatus control unit 111 described later, content can be switched without overlapping with a portion already reproduced.

The content reproduction processing unit 107 can also process reproduction lists of different content types such as a reproduction list about photo content and that about music content at the same time. Accordingly, the information processing apparatus 10 according to the present embodiment can realize complex content reproduction such as performing reproduction processing of photo content by operating music content together. Moreover, even if the information processing apparatus 10 according to the present embodiment functions as a DMC, the renderer apparatus 30 can be caused to realize complex content reproduction by the renderer apparatus 30 being notified of URLs of different content types together from the renderer apparatus control unit 111 described later.

The display control unit 109 is constituted, for example, by a CPU, ROM, and RAM, and exercises display control for the display in the display unit (not shown) of the information processing apparatus 10 by executing content data or cache information of thumbnail transmitted from the content reproduction processing unit 107. More specifically, when the information processing apparatus 10 according to the present embodiment functions as a DMP (that is, when content is reproduced by the information processing apparatus 10 according to the present embodiment), the display control unit 109 exercises display control to display content in the display unit by reproducing content data transmitted from the content reproduction processing unit 107. When the information processing apparatus 10 according to the present embodiment functions as a DMC (that is, when content is reproduced by the renderer apparatus 30), the display control unit 109 exercises display control to display content in the display unit by reproducing cache information of thumbnail transmitted from the content reproduction processing unit 107.

In the above description, the function of the display control unit 109 is described by mainly taking content data containing images such as photo content and video content as examples, but if content data contains only sound data such as music content, the content reproduction processing unit 107 reproduces the sound data. If, when music content or the like is reproduced, the display unit is caused to display various kinds of image content in synchronization with the reproduction of the music content, the display control unit 109 can exercise display control of image content in synchronization with the reproduction of the music content.

The renderer apparatus control unit 111, which is an example of an externally connected device control unit, is constituted, for example, by a CPU, ROM, and RAM, and controls the renderer apparatus when the renderer apparatus 30 is caused to reproduce content selected from a content list.

Before exercising control for content reproduction, the renderer apparatus control unit 111 acquires attribute information (renderer apparatus attribute information) about the renderer apparatus 30 to which the information processing apparatus 10 according to the present embodiment is connectible. The renderer apparatus attribute information contains not only information about the network address allocated to the renderer apparatus 30 and types of content (for example, photo content, video content, and music content) reproducible by the renderer apparatus 30, but also information about the name given to the renderer apparatus 30 and an icon given to the renderer apparatus 30. The renderer apparatus control unit 111 can cause the content information acquisition unit 101, the content list generation unit 105, and the content reproduction processing unit 107 to use the renderer apparatus attribute information for processing in each processing unit by notifying each processing unit of the attribute information. The renderer apparatus control unit 111 can record the renderer apparatus attribute information in the storage unit 113 described later, for example, in a form of database.

The renderer apparatus control unit 111 can acquire the renderer apparatus attribute information from the renderer apparatus 30 in advance in any timing, for example, when the information processing apparatus 10 itself is started, the renderer apparatus 30 connected to the communication network 3 is started, or the information processing apparatus 10 is connected to the renderer apparatus 30 to record the renderer apparatus attribute information in the storage unit 113 as a cache.

When a selection is made to reproduce content in the renderer apparatus 30, the renderer apparatus control unit 111 sets location information (URL) of content described in the reproduction list to the renderer apparatus 30. Further, the renderer apparatus control unit 111 transmits a reproduction request to start reproduction of content data acquired from the content management server 20 to the renderer apparatus 30 to instruct the start of content reproduction.

Moreover, the renderer apparatus control unit 111 transmits a reproduction state information acquisition request to acquire the reproduction state of content in the renderer apparatus 30 at predetermined intervals (for example, every one second). The reproduction state of content in the renderer apparatus 30 includes information whether the display of content data of the designated URL received from the content management server 20 in the screen is completed and how far content that changes with time such as music content and video content has been reproduced. Further, the reproduction state of content includes, in addition to the above, information about reproduction control of content such as whether the designation of another URL or reproduction stop request by another DMC is received. By transmitting such a reproduction state information acquisition request, unexpected situations when, for example, content expected by the user of the information processing apparatus 10 could not be displayed, can swiftly be dealt with.

In order to check, among reproduction states of the renderer apparatus 30, states of reproduction, stop, and pause and therebetween and URLs of content to be reproduced, in addition to the above method of requesting periodic confirmation from the information processing apparatus 10 functioning as a DMC described above, such states can be known from notification (GENA eventing) from the renderer apparatus 30. To receive a notification from the renderer apparatus 30 by GENA, the information processing apparatus 10 performs notification request processing (Subscribe) of an event before performing processing to issue a request to the renderer apparatus 30.

By using reproduction state information of the acquired content, for example, processing described below can be performed. If, for example, a plurality of the renderer apparatuses 30 is caused to reproduce content that does not change with time such as photo content (that is, a slideshow display of content is made), the renderer apparatus control unit 111 starts to measure the slideshow display switching time when a reproduction state indicating that content selected by the user has been displayed correctly on the renderer apparatuses 30 is acquired. Here, when the slideshow display switching time passes a fixed time, the renderer apparatus control unit 111 instructs processing of the next item in the reproduction list, enabling realization of display switching control of content.

When content with a time width for reproduction itself such as music content and video content is reproduced, it is preferable to be able to provide the position currently being reproduced in the screen of the information processing apparatus 10 as feedback to the user. Thus, the renderer apparatus control unit 111 acquires the current reproducing point from the renderer apparatus 30 by using reproduction state information of the acquired content so that the corresponding cache data can be displayed on the information processing apparatus 10 functioning as a DMC by using the position information.

When the renderer apparatus 30 is caused to reproduce video content, more intuitive feedback can be given to the user by displaying a thumbnail image in the screen of the information processing apparatus 10 matching an actual image at the reproducing point in the renderer apparatus 30. To realize this, video content is analyzed in advance to detect time positions to be characteristic points in video such as a scene change and a climax of sound at constant intervals and a list (hereinafter, referred to as a film roll) pairing time information of such points and frame images is generated as metadata (attribute information) of the content. When the video content is reproduced by the renderer apparatus 30, the corresponding time position and frame image are acquired from the film roll based on the reproducing point acquired from the renderer apparatus 30 to display the frame image in the screen of the information processing apparatus 10 functioning as a DMC.

An analysis to generate a film roll may be performed on the content management server 20 managing video content to release obtained analysis results as attribute information in the CDS so that when content information is collected by the information processing apparatus 10, attribute information about the film roll is also acquired. If the content management server 20 does not have the above analysis function, the information processing apparatus 10 may temporarily download video content on the content management server 20 so that, after an analysis is performed, analysis results are stored in a cache database stored in the storage unit 113.

The storage unit 113 has a database in which content information or the like acquired by the content information acquisition unit 101 is described recorded therein together with the generation time. Content data itself may be recorded in the storage unit 113. Various parameters that become necessary to store when the information processing apparatus 10 according to the present embodiment performs some kind of processing and progress of processing, or various databases may also be stored in the storage unit 113 when necessary. The content information acquisition unit 101, the user input processing unit 103, the content list generation unit 105, the content reproduction processing unit 107, the display control unit 109, the renderer apparatus control unit 111 and the like can freely read/write from/to the storage unit 113.

The information processing apparatus 10 according to the present embodiment has, as described above, the functions of the DMP and DMC in the DLNA guideline and is capable of reproducing content in the DMS and instructing the DMR to reproduce content. The information processing apparatus 10 also has a collection function to locally store URLs, metadata, and thumbnail images of the content stored in a plurality of DMS present in a home network by incorporating such data into a database for caching. The information processing apparatus 10 according to the present embodiment can provide a display that makes it unnecessary to be aware of each DMS on which content is stored by configuring a content list based on a cache database recorded in the storage unit 113.

A content list to be generated can be classified according to specific section (for example, the date, play list, channel, genre, viewing state, and automatic channel) to make an icon display of content in specific order. When an object such as an icon or thumbnail is selected by the user, the corresponding content can be acquired from the content management server 20 to display the content in the screen. When the information processing apparatus 10 itself has a function of the DMS and directly manages content data, the content data managed by the information processing apparatus 10 can also be reproduced.

When instructed to reproduce one or a plurality of pieces of content selected by the user in the DMR, the information processing apparatus 10 according to the present embodiment functions as a DMC to reproduce content selected from the DMR.

In the information processing apparatus 10 according to the present embodiment, a virtual reproduction list as shown in FIG. 3A is created when content is selected and reproduced to reproduce the content in the list in turn. For example, when a plurality of pieces of photo content is selected and reproduction thereof is started, reproduction of a so-called slideshow is started. The information processing apparatus 10 according to the present embodiment can exercise reproduction control based on the same list regardless of whether content is reproduced by a DMP or a DMR by containing information (for example, the URL, metadata, thumbnail images and the like of content) necessary to reproduce content both by the DMP and DMR as information about the content in the reproduction list. Therefore, when the information processing apparatus 10 according to the present embodiment is reproducing content as a DMP, reproduction of the content can be switched to a DMR halfway through the content.

When the function is switched to behave as a DMC, the information processing apparatus 10 according to the present embodiment displays metadata and thumbnail images of content of which the DMR is instructed to reproduce in the display unit of the information processing apparatus 10. Accordingly, the user of the information processing apparatus 10 can check the reproduction state by the DMR in the screen of the information processing apparatus 10 functioning as a DMC.

An example of functions of the information processing apparatus 10 according to the present embodiment has been shown. Each of the above components may be constituted by using general-purpose members and circuits or by hardware specialized for the function of each component. Additionally, the function of each component may all be performed by a CPU or the like. Therefore, the configuration to be used can be changed in accordance with the technical level when the present embodiment is carried out if necessary.

<Information Processing Method>

Figure 4:
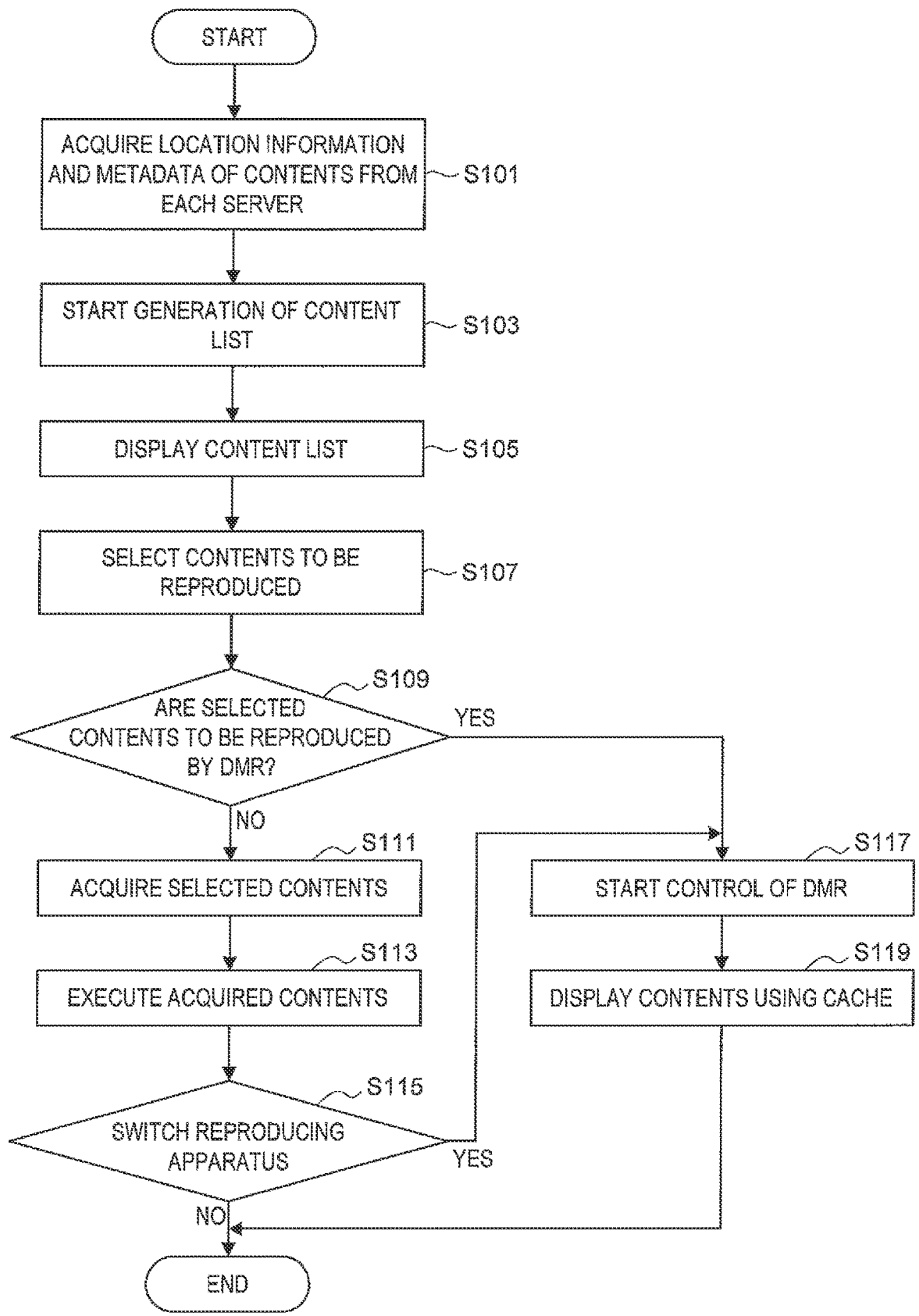
FIG. 4 is a flow chart illustrating an information processing method according to the first embodiment.
Figure 5:
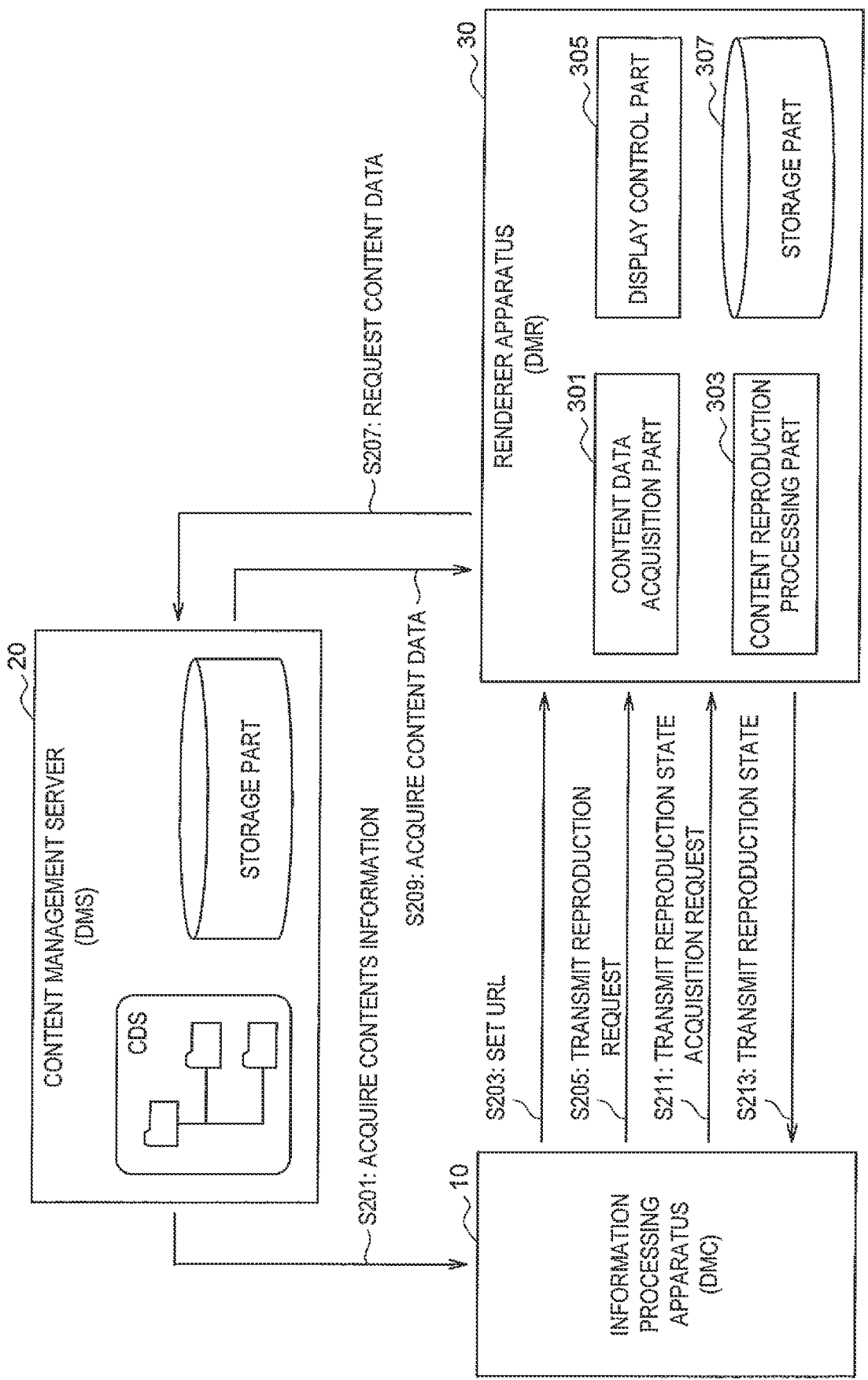
FIG. 5 is an explanatory view exemplifying the information processing method according to the first embodiment.
Figure 6:
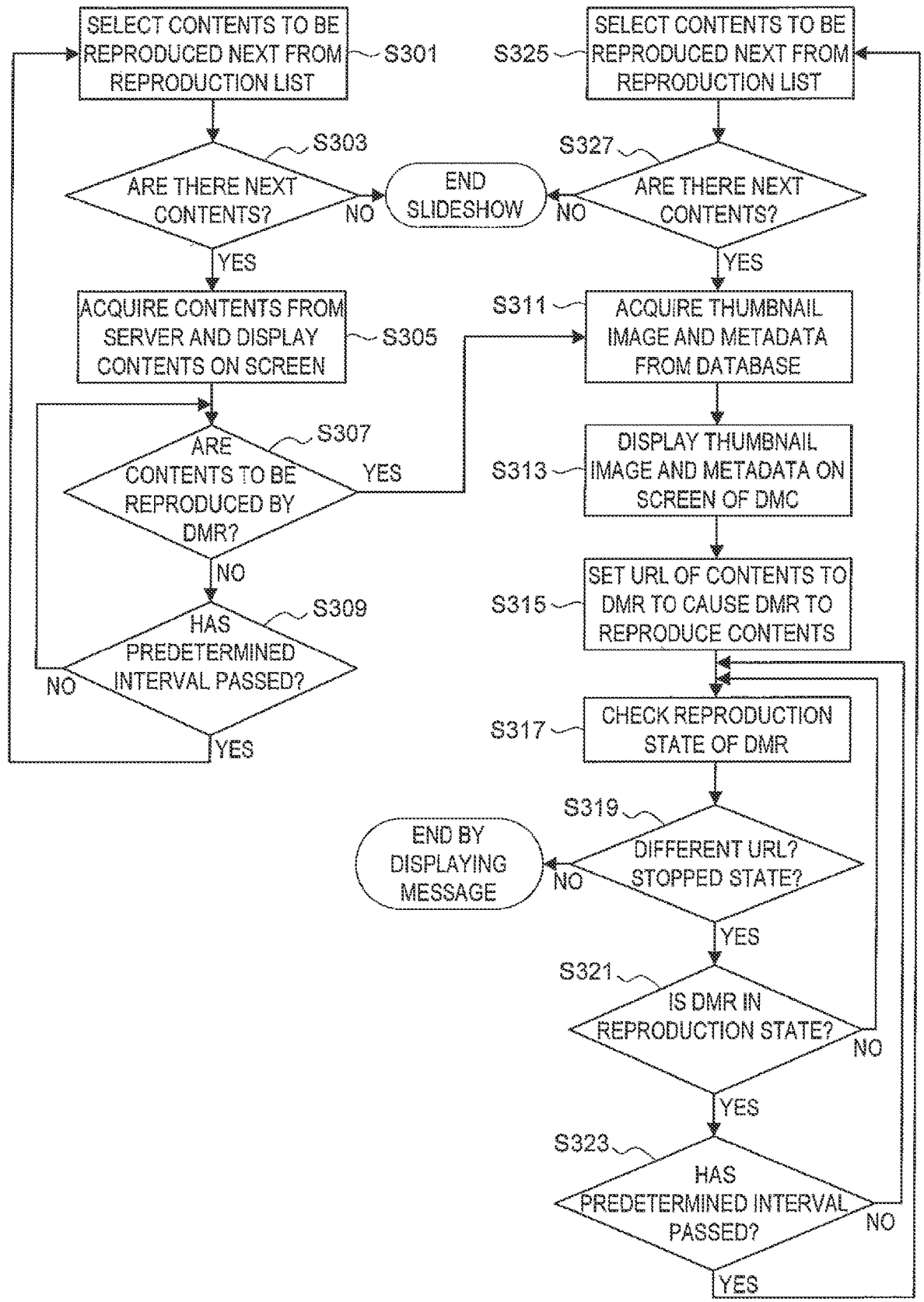
FIG. 6 is a flow chart exemplifying the information processing method according to the first embodiment.

Subsequently, the information processing method according to the present embodiment will be described in detail with reference to FIGS. 4 to 6. FIG. 4 is a flow chart illustrating an information processing method executed by the information processing apparatus 10 according to the present embodiment. FIG. 5 is an explanatory view illustrating the information processing method when the information processing apparatus 10 according to the present embodiment functions as a DMC. FIG. 6 is a flow chart illustrating the information processing method when content is reproduced as a slideshow.

First, the flow of the information processing method according to the present embodiment will be described in detail with reference to FIG. 4. In the information processing method according to the present embodiment, the content information acquisition unit 101 first acquires content information (for example, location information and metadata) about content managed by each of the content management servers 20 from each of the content management servers 20 (step S101). The content information is acquired in any timing, for example, when the information processing apparatus 10 itself is started, the content management server 20 connected to the communication network 3 is started, or the information processing apparatus 10 is connected to the content management server 20. When content information containing at least location information and metadata is acquired, the content information acquisition unit 101 associates the content information with the acquired date/time before recording the content information in the storage unit 113.

Along with the acquisition of content information, the renderer apparatus control unit 111 of the information processing apparatus 10 may acquire renderer apparatus attribute information of the renderer apparatus 30 to which the information processing apparatus 10 can be connected. The acquired renderer apparatus attribute information is preferably recorded in the storage unit 113 after being associated with the acquired date/time.

Along with the acquisition of content information, the content information acquisition unit 101 of the information processing apparatus 10 may determine the operating state of the content management server 20 connected to the information processing apparatus 10. If the operating state is determined, a determination result thereof is recorded in the storage unit 113 after being associated with the determination date/time.

If the user of the information processing apparatus 10 selects a generation instruction of a content list in some timing, the user input processing unit 103 of the information processing apparatus 10 transmits a message to the effect that a generation instruction of a content list is selected by the user to the content list generation unit 105. After receiving the message, the content list generation unit 105 starts to generate a content list (step S103).

More specifically, the content list generation unit 105 references the storage unit 113 to acquire the latest content information and generates a content list based on the acquired content information. If any determination result about the operating state of the content management server 20 or renderer apparatus attribute information about the renderer apparatus 30 is present in the storage unit 113, the content list generation unit 105 may add such information to a content list to be generated. It is possible, for example, to set to make a grayout display for content stored in a server for which data of a determination result by the content management server indicates a non-operating state or add information about the selectable renderer apparatus 30 to a pull-down menu or popup menu of the content list. The content list generation unit 105 transmits the generated content list to the display control unit 109 to cause the display unit (not shown) of the information processing apparatus 10 to display the content list (step S105).

If the user of the information processing apparatus 10 selects some piece of content at some point in time (step S107), the user input processing unit 103 converts user input into a predetermined signal and makes a notification to the content reproduction processing unit 107. After receiving the notification from the user input processing unit 103, the content reproduction processing unit 107 generates a reproduction list constituted from content selected by the user while referencing databases recorded in the storage unit 113.

Subsequently, the content reproduction processing unit 107 determines whether to reproduce the selected content by the information processing apparatus 10 or the renderer apparatus 30 (step S109). More specifically, if a notification is made by a signal from the user input processing unit 103 that content will be reproduced by the renderer apparatus 30, the content reproduction processing unit 107 performs processing at step S117 and thereafter described later. If no notification is made by a signal that content will be reproduced by the renderer apparatus 30, or a notification is made by a signal that content will be reproduced by the information processing apparatus 10, the content information acquisition unit 101 acquires content data from the content management server 20 based on the generated reproduction list (step S111) and transmits the acquired content data to the content reproduction processing unit 107. The content reproduction processing unit 107 performs reproduction processing of the acquired content data and, if it is necessary to display image data in the display unit (not shown), causes the display unit to display the image via the display control unit 109.

Here, if content is reproduced by the information processing apparatus 10 and a notification to switch the reproduction apparatus to a renderer apparatus is transmitted from the user input processing unit 103 (step S115), the content reproduction processing unit 107 performs processing at step D117 described later. If no such notification is made, the content reproduction processing unit 107 reproduces content based on the reproduction list and terminates reproduction processing when reproduction terminates.

If reproduction of content by the renderer apparatus 30 is selected, the information processing apparatus 10 starts control of the renderer apparatus 30 (step S117). First, the content reproduction processing unit 107 makes a notification to the renderer apparatus 30 whose URL described in the reproduction list is designated via the renderer apparatus control unit 111. Subsequently, when acquisition of content data is completed in the renderer apparatus 30, the renderer apparatus control unit 111 transmits a reproduction start request to the renderer apparatus 30. When reproduction of content starts, the renderer apparatus control unit 111 notifies the renderer apparatus 30 of a reproduction state information acquisition request of content at predetermined intervals (for example, every one second).

When reproduction of content starts in the renderer apparatus 30, the content reproduction processing unit 107 of the information processing apparatus 10 also displays the reproduction state in the display unit using cache data such as a thumbnail recorded in the storage unit 113 (step S119).

Subsequently, the information processing method when the information processing apparatus 10 according to the present embodiment functions as a DMC with reference to FIG. 5.

In the information processing method according to the present embodiment, as described above, the content information acquisition unit 101 of the information processing apparatus 10 acquires content information from each of the content management servers 20 (step S201) to generate a content list. When the user selects content desired to be reproduced from the content list and also selects reproduction of the content by the renderer apparatus 30 connected to the information processing apparatus 10, the renderer apparatus control unit 111 of the information processing apparatus 10 transmits a URL described in the reproduction list generated by the content reproduction processing unit 107 to the renderer apparatus 30 to set the URL of content (step S203). The renderer apparatus control unit 111 of the information processing apparatus 10 also transmits a reproduction request of content (step S205) to instruction reproduction of the content.

After receiving the URL, a content data acquisition unit 301 of the renderer apparatus 30 notifies the content management server 20 of an acquisition request of content data through HTTP connection by referencing the notified URL (step S207). The content data acquisition unit 301 of the renderer apparatus 30 acquires content data from the content management server 20 (step S209). The acquired content data is reproduced by a content reproduction processing unit 303 of the renderer apparatus 30 and, if necessary, display 303 is exercised by a display control unit 305. When content data is acquired or content is reproduced, each processing unit of the renderer apparatus 30 can refer various databases recorded in a storage unit 307.

The renderer apparatus control unit 111 of the information processing apparatus 10 also transmits a reproduction state information acquisition request of content in the renderer apparatus 30 at predetermined intervals (step S211). The content reproduction processing unit 303 of the renderer apparatus 30 transmits the reproduction state in the renderer apparatus 30 to the information processing apparatus 10 (step S213). The information processing apparatus 10 can perform various kinds of processing based on the received reproduction state of content.

According to the information processing method in the present embodiment, as described above, a thumbnail image is displayed in the display screen of the information processing apparatus 10 when the information processing apparatus 10 functions as a DMC. Accordingly, the user of the information processing apparatus 10 can intuitively check content being reproduced by the renderer apparatus 30 on the information processing apparatus 10.

Depending on the type of the content management server 20, the content management server 20 may not be able to receive a plurality of connection requests of an HTTP simultaneously to deliver content to the information processing apparatus 10 and the renderer apparatus 30, which are client devices. However, according to the information processing apparatus 10 and the information processing method in the present embodiment, when the information processing apparatus 10 functions as a DMC, the reproduction state in the renderer apparatus 30 can be checked by causing the display unit to display thumbnail images cached in advance. Accordingly, the need to transmit a connection request from the information processing apparatus 10 functioning as a DMC to the content management server 20 is eliminated so that connection from the renderer apparatus 30 that should reproduce content to the content management server 20 can be prevented from being disturbed.

Further, in the information processing method according to the present embodiment, the selection of content to be reproduced by the renderer apparatus 30 can be made based on a database in which information is cached from content information and therefore, the renderer apparatus 30 can be caused to continuously reproduce content present on a plurality of the content management servers 20.

Next, the flow of the information processing method will be described in detail by taking an example in which the information processing apparatus 10 according to the present embodiment reproduces content as a slideshow with reference to FIG. 6.

The content reproduction processing unit 107 of the information processing apparatus 10 selects content to be reproduced next from a generated reproduction list (step S301). At this point, whether or not there is content to be reproduced next is determined (step S303). If there is no content to be reproduced next, the content reproduction processing unit 107 terminates the slideshow reproduction. If there is content to be reproduced next, the content reproduction processing unit 107 of the information processing apparatus 10 requests the content information acquisition unit 101 to acquire content data and the content information acquisition unit 101 acquires content data from the content management servers 20. Subsequently, the content reproduction processing unit 107 and the display control unit 109 display the acquired content data in the screen (step S305) and starts measurement of the time to control the slideshow interval.

Here, the content reproduction processing unit 107 determines whether or not reproduction by the renderer apparatus 30, which is an externally connected device, is designated (step S307). If reproduction by the renderer apparatus 30 is designated, the content reproduction processing unit 107 performs processing at step S311 and thereafter described later. If reproduction by the renderer apparatus 30 is not selected, the content reproduction processing unit 107 determines whether or not a predetermined time interval has passed (in other words, whether or not a preset slideshow interval has passed) (step S309). If the predetermined time interval has not passed, the content reproduction processing unit 107 waits to see whether or not reproduction by the renderer apparatus 30 is designated while continuing to display the content currently being reproduced. If the predetermined time interval has passed, the content reproduction processing unit 107 determines that the timing to switch the display of content has come and performs processing at step S301.

If, on the other hand, reproduction by the renderer apparatus 30 is designated at step S307, the content reproduction processing unit 107 acquires a thumbnail image and metadata corresponding to the content currently being reproduced from a database recorded in the storage unit 113 (step S311). Subsequently, the content reproduction processing unit 107 and the display control unit 109 of the information processing apparatus 10 that starts to function as a DMC display the acquired thumbnail image and metadata in the display unit (step S313).

Next, the renderer apparatus control unit 111 of the information processing apparatus 10 sets the URL of content to the renderer apparatus 30 to start reproduction of the content (step S315).

The renderer apparatus control unit 111 of the information processing apparatus 10 checks the reproduction state of the renderer apparatus 30 (step S317) each time a predetermined time interval (for example, one second) passes to make a determination based on reproduction state information of the acquired renderer apparatus 30 (step S319). If the reproduction state transmitted from the renderer apparatus 30 indicates that a different URL being reproduced or reproduction of content being stopped, the renderer apparatus control unit 111 regards operations to the renderer apparatus 30 being interrupted and terminates the slideshow reproduction by displaying a message. If reproduction state information received from the renderer apparatus 30 is not as mentioned above, the renderer apparatus control unit 111 subsequently determines whether or not the renderer apparatus 30 is in the reproduction state (step S321). If the renderer apparatus 30 is not in the reproduction state, the renderer apparatus control unit 111 returns to step S317 to check the reproduction state of the renderer apparatus 30. If the renderer apparatus 30 is in the reproduction state, the renderer apparatus control unit 111 determines whether or not a predetermined time interval has passed (in other words, whether or not a preset slideshow interval has passed) (step S323). If the predetermined time interval has not passed, the renderer apparatus control unit 111 returns to step S317 to check the reproduction state of the renderer apparatus 30. If the predetermined time interval has passed, the renderer apparatus control unit 111 determines that the timing to switch the display of content has come and performs processing at step S325.

If the renderer apparatus control unit 111 determines that the timing to switch the display of content has come, the content reproduction processing unit 107 selects content to be displayed next from the reproduction list (S325). At this point, whether or not there is content to be reproduced next is determined (step S327). If there is no content to be reproduced next, the content reproduction processing unit 107 terminates the slideshow reproduction. If there is content to be reproduced next, the content reproduction processing unit 107 performs processing at step S311 and thereafter.

By performing processing described above, an information processing apparatus according to the present embodiment can carry out slideshow reproduction of content even when the information processing apparatus functions as a DMP or as a DMC.

<Concrete Examples of the Information Processing Method>

Subsequently, concrete examples of the information processing method according to the present embodiment will be described in detail with reference to FIGS. 7 to 13. FIGS. 7 to 13 are explanatory views illustrating concrete examples of the information processing method according to the present embodiment.

[An Example of the User Interface]

The information processing method executed by the information processing apparatus 10 according to the present embodiment will be described in detail below by taking an example of a user interface.

The information processing apparatus 10 according to the present embodiment has a user interface (UI) as shown, for example, in FIG. 7 displayed in the display unit (not shown). In the user interface, a content display area 501 has content type display objects 503 representing content types and hierarchical container display objects 505 related to each content type displayed therein orthogonal to each other.

The content display area 501 also has selection objects 507 for selecting objects being displayed and command selection objects 509 displayed therein.

The content type display object 503 is an object such as an icon representing the type of content and in FIG. 7, an "option" object, a "photo" object, a "music" object, a "video" object, and a "video (TV recording)" object are displayed from the left in order.

In a user interface according to the present embodiment, content data is hierarchically stored for each type of content. In the example shown in FIG. 7, for example, content belonging to the "photo" object is classified into two containers, a "play list" container and a "date" container.

Examples of hierarchical containers set for each type of content are shown in FIG. 8.

As shown in FIG. 8, each type of content has a hierarchical structure of three levels from the first layer to the third layer, and a collection of content data is stored in the third layer as items.

Content displayed as second layer objects and third layer objects includes not only content stored in the information processing apparatus 10, but also all content stored in the content management server 20 connectable by the information processing apparatus 10. When content is displayed, which content belongs to which device is not displayed. Therefore, the user can perform operations as if to select content stored in one device without the need to be aware of which content belongs to which device.

Figure 9:
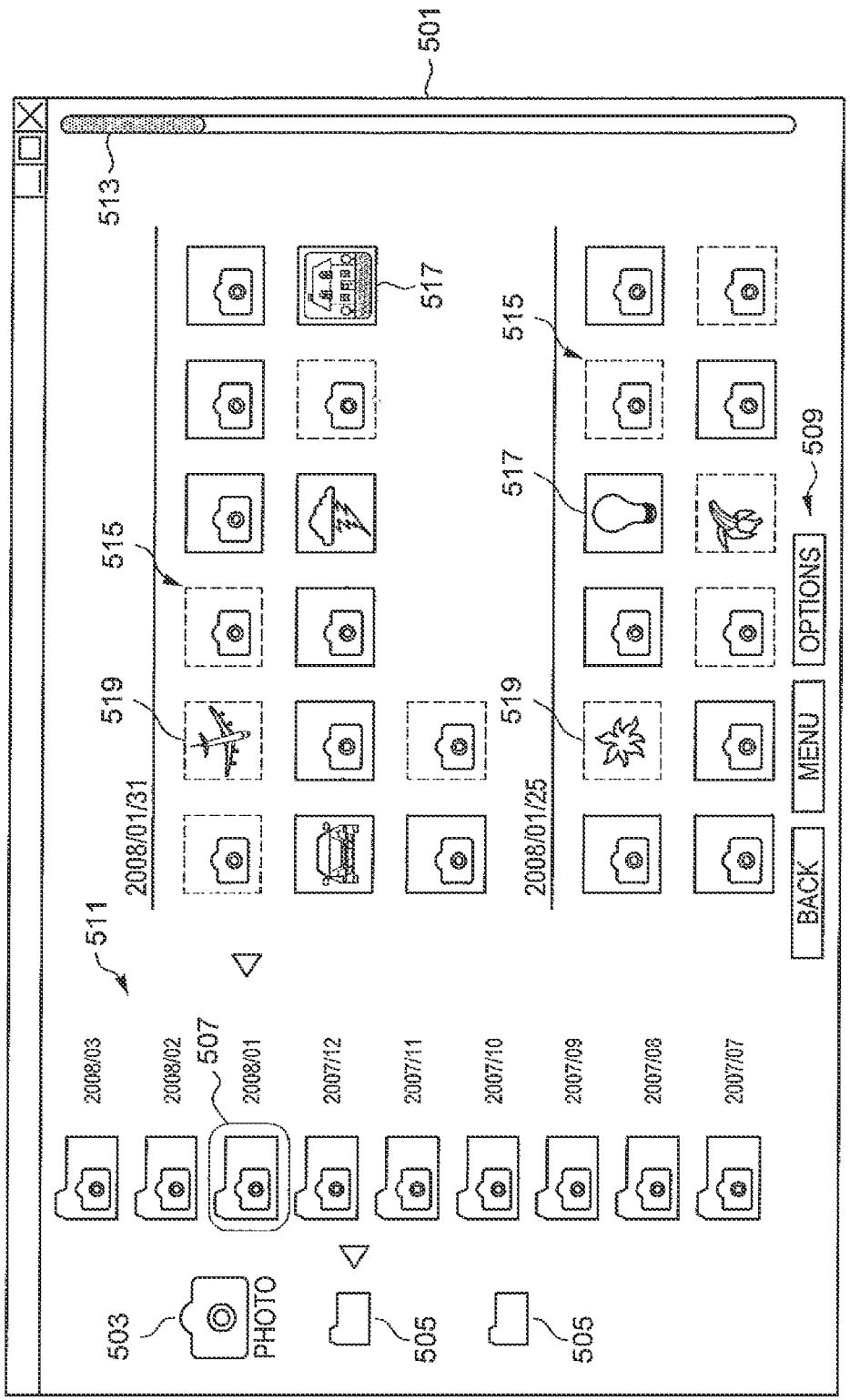
FIG. 9 is an explanatory view illustrating a concrete example of the information processing method according to the first embodiment.

The example shown in FIG. 9 shows a case in which the "photo" content is selected as the content type object 503 and further, a "year/month" container belonging to the first layer is selected as the hierarchical container display objects 505.

If the user of the information processing apparatus 10 selects, for example, a container of "2008/01", as shown in FIG. 9, photo content photographed in January 2008 is classified by shooting date and displayed. At this point, content 517 stored in the content management server 20 and the information processing apparatus 10 itself in the operating state is displayed in normal brightness as a thumbnail, and content 519 stored in the content management server 20 in the non-operating state is displayed in grayout display as a thumbnail. In FIG. 9, thumbnails whose outer frame is displayed by dotted lines indicate a grayout display. If thumbnail data is not present, as shown in FIG. 9, a default object is displayed in place of the thumbnail.

Here, if, as shown in FIG. 9, the applicable container is not displayed in one screen, a scroll bar 513 is displayed in the content display area 501.

Figure 10:
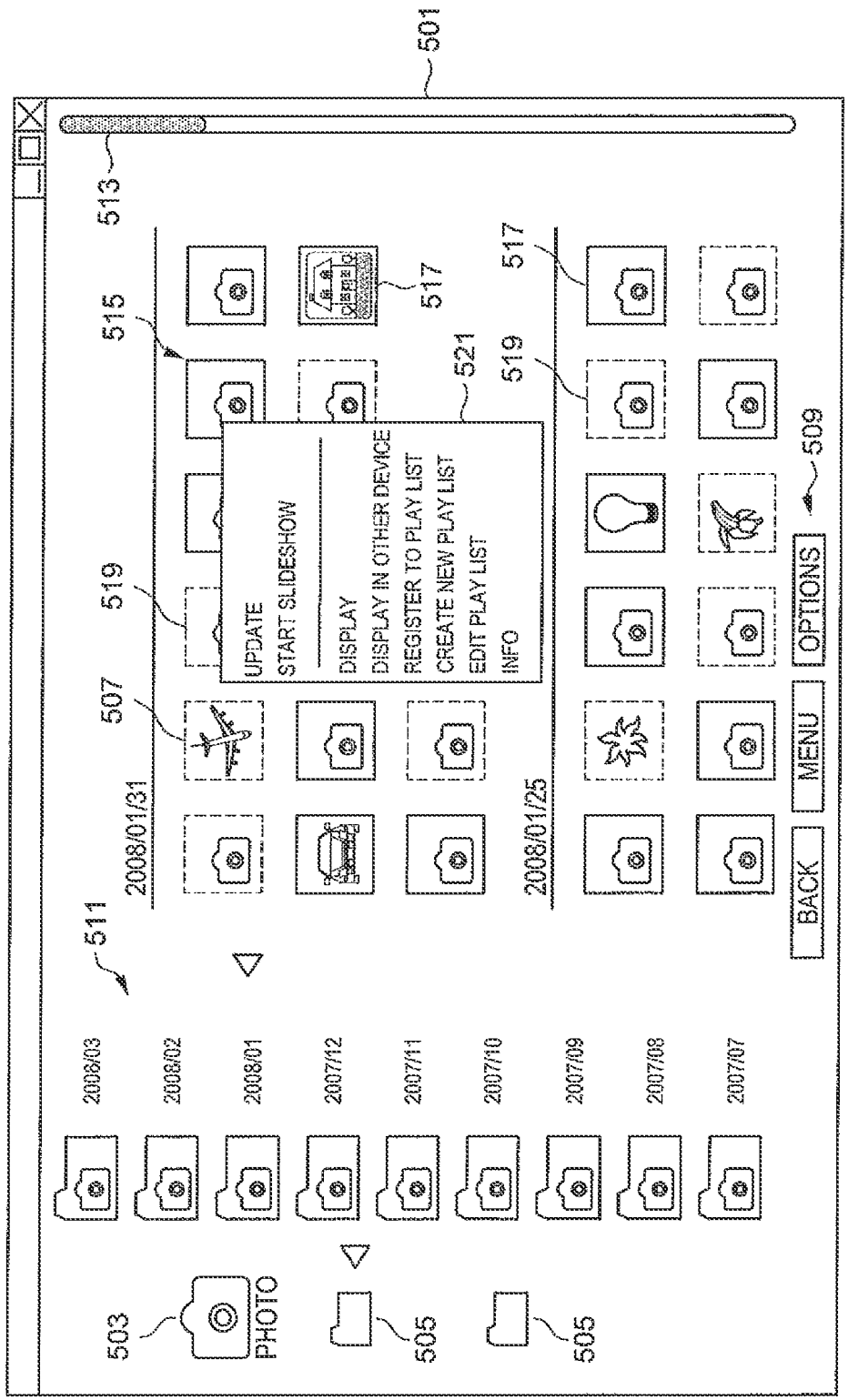
FIG. 10 is an explanatory view illustrating a concrete example of the information processing method according to the first embodiment.

Here, if the user operates the selection objects 507 to select one piece or a plurality of pieces of content, a command selection window 521 as shown in FIG. 10 is displayed. If a "Display" command in the command selection window 521 is selected, the selected content can be reproduced in the information processing apparatus 10. If a "Display in other device" command in the command selection window 521 is selected, the information processing apparatus 10 according to the present embodiment functions as a DMC and the designated renderer apparatus 30 can be caused to reproduce content.

Figure 11:
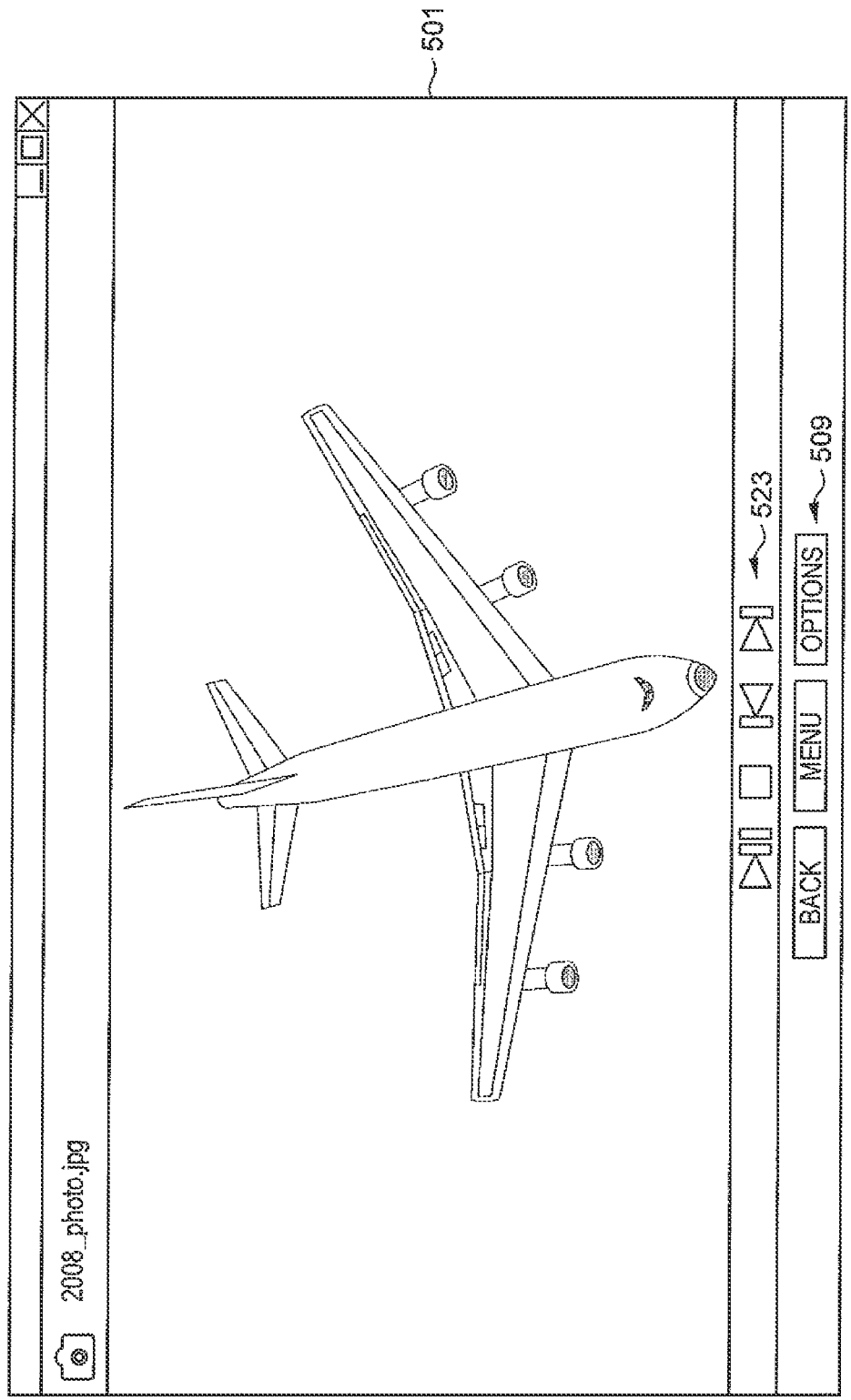
FIG. 11 is an explanatory view illustrating a concrete example of the information processing method according to the first embodiment.

If, for example, the "Display" command is selected in the command selection window 521, as shown in FIG. 11, display content in the content display area 501 changes to reproduce the selected content. As shown in FIG. 11, content execution control buttons 523 are displayed in the execution screen of content. At this point, the information processing apparatus 10 according to the present embodiment functions as a DMP and therefore, the information processing apparatus 10 acquires content data from the content management server 20 managing the content selected by the content information acquisition unit 101 and reproduces the content based on the acquired content data.

Figure 12:
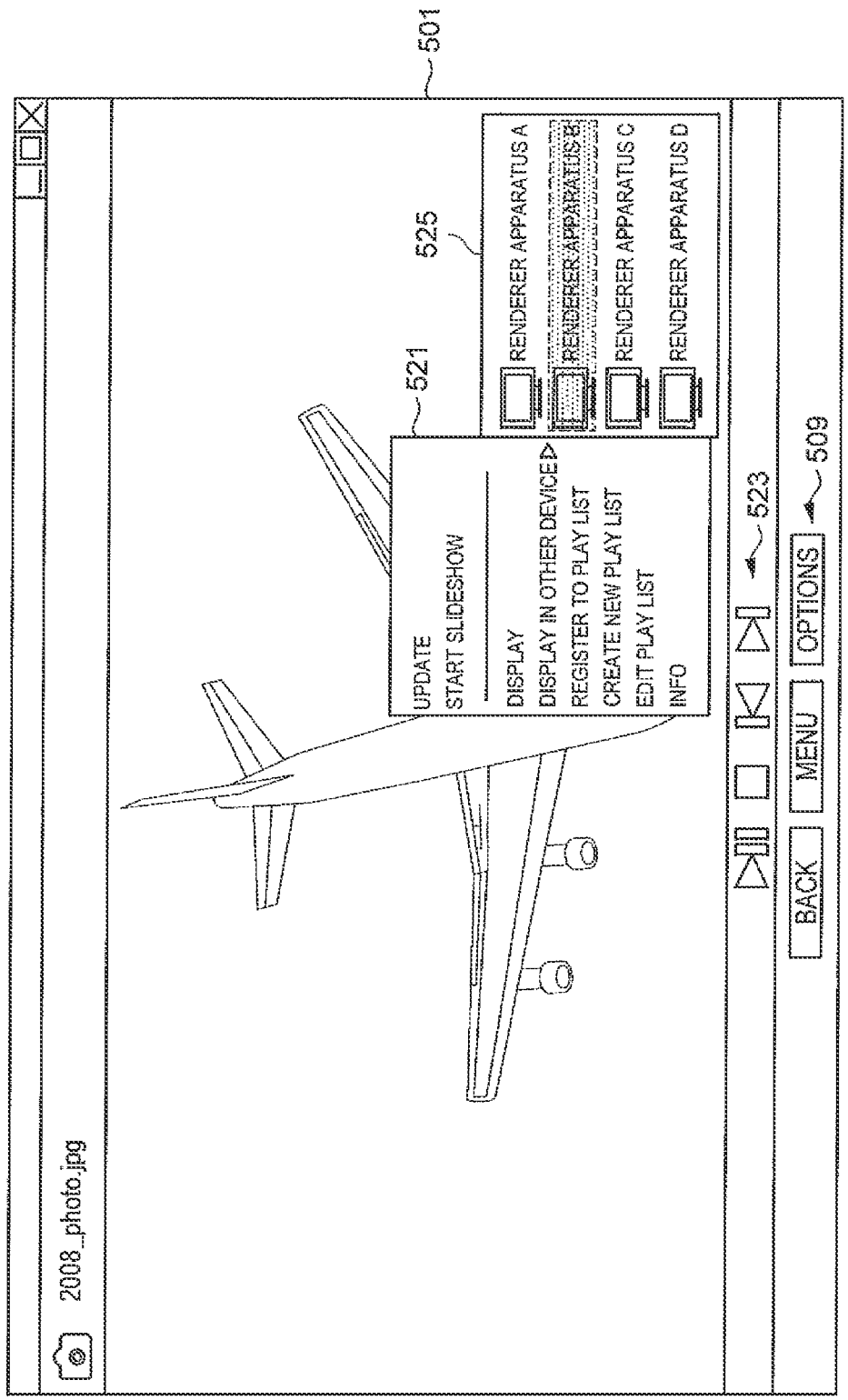
FIG. 12 is an explanatory view illustrating a concrete example of the information processing method according to the first embodiment.

For example, by right-clicking or pressing a predetermined key while content being reproduced, as shown in FIG. 12, the command selection window 521 can be caused to display. If, in this case, the "Display in other device" command is selected, a list of the renderer apparatuses 30 capable of reproducing content is displayed as a renderer apparatus display window 525. A plurality of the renderer apparatuses 30 connected via a network is displayed in the renderer apparatus display window 525 and the user of the information processing apparatus 10 can designate the renderer apparatus 30 of the selected content from the plurality of the displayed renderer apparatuses 30. As shown in FIG. 12, objects such as icons attached to renderer apparatuses and names attached to the renderer apparatuses are displayed in the renderer apparatus display window 525. The order of display of the renderer apparatuses may be according to predetermined rules or according to the order of detection. A renderer apparatus that may not be designated to reproduce content (for example, a renderer apparatus that is not turned on, in a sleep state, or disconnected from a network so that no response is received) is displayed, as shown in FIG. 12, in grayout display and may not be selected as a renderer apparatus to reproduce content. In FIG. 12, a renderer apparatus whose outer frame is displayed by dotted lines indicates a grayout display. In the renderer apparatus display window 525, all the renderer apparatuses 30 connected to a network may be displayed regardless of whether or nor designable, as shown above, or only the renderer apparatuses 30 connected to a network and designable as a renderer apparatus to reproduce content may be displayed.

Figure 13:
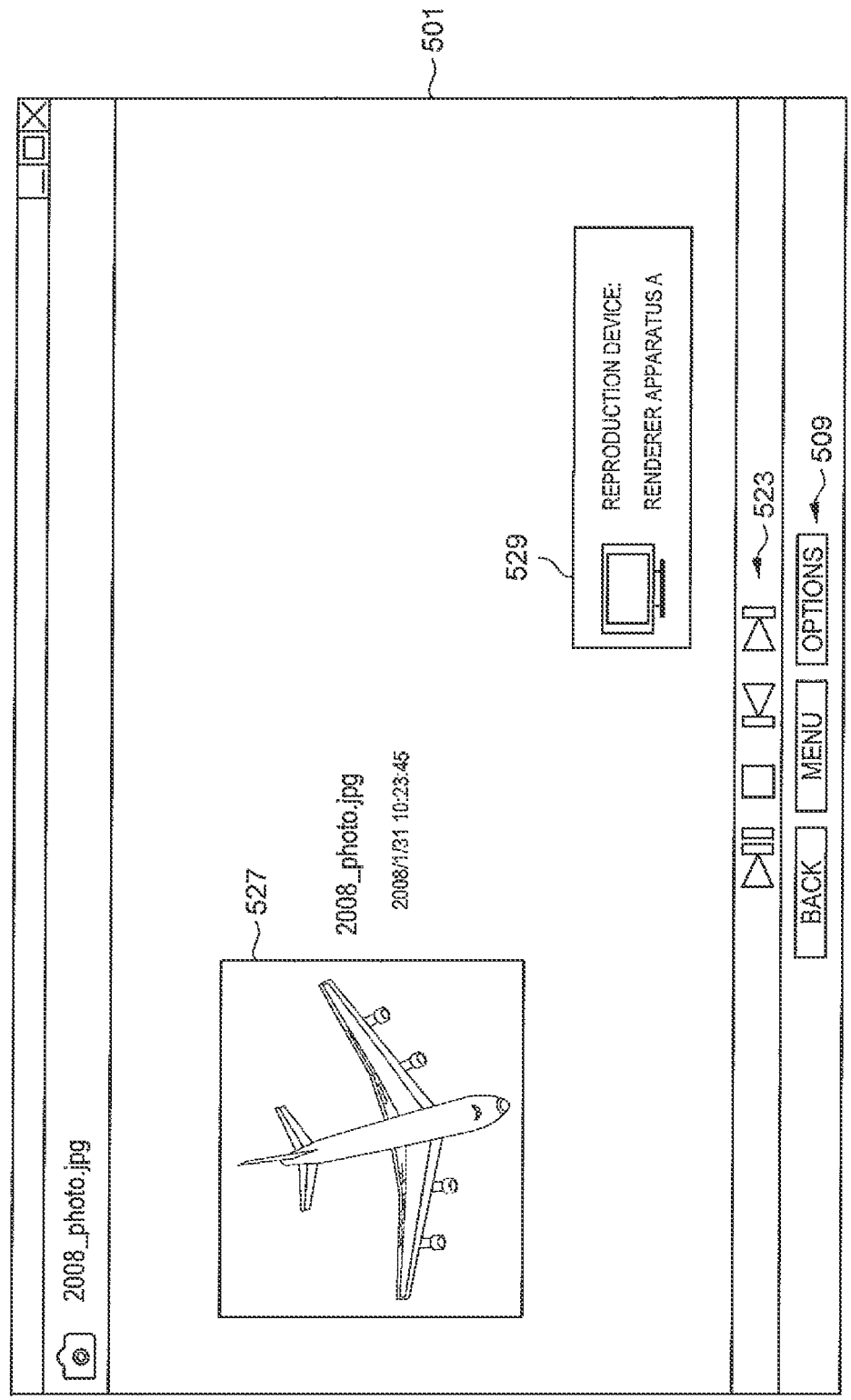
FIG. 13 is an explanatory view illustrating a concrete example of the information processing method according to the first embodiment.

If the apparatus desired for reproduction is selected from among renderer apparatuses displayed in the renderer apparatus display window 525, reproduction of content starts in the selected renderer apparatus 30. Further, as shown in FIG. 13, a thumbnail 527 corresponding to the content being reproduced by the renderer apparatus 30 is displayed in the display screen of the information processing apparatus 10 after being acquired from the storage unit 113 of the information processing apparatus 10. Also, information about the renderer apparatus 30 reproducing content is displayed in the display screen of the information processing apparatus 10 as a reproduction device information display window 529. In the reproduction device information display window 529, for example, as shown in FIG. 13, the icon and name of the renderer apparatus 30 reproducing content whose thumbnail is displayed are displayed.

In the information processing method according to the present embodiment, as described above, when the information processing apparatus 10 functions as a DMC, the information processing apparatus 10 displays thumbnail data cached in advance and the renderer apparatus 30 acquires content data from the content management server 20 to reproduce content. In accordance with the DLNA guideline focused on by an information processing system according to the present embodiment, the content management server 20 may not be able to simultaneously receive a plurality of connection requests of HTTP to deliver content. However, the information processing apparatus 10 according to the present embodiment makes a display based on cache data when the information processing apparatus 10 functions as a DMC and therefore, the renderer apparatus 30 can establish a connection by the HTTP with the content management server 20 so that loads of the content management server 20 can be reduced.

In the foregoing, the information processing method executed by the information processing apparatus 10 according to the present embodiment has been described in detail by taking an example of the user interface. However, the above example is only an example and a user interface of the information processing apparatus 10 according to the present embodiment is not limited to the above example.

<Hardware Configuration>

Figure 14:
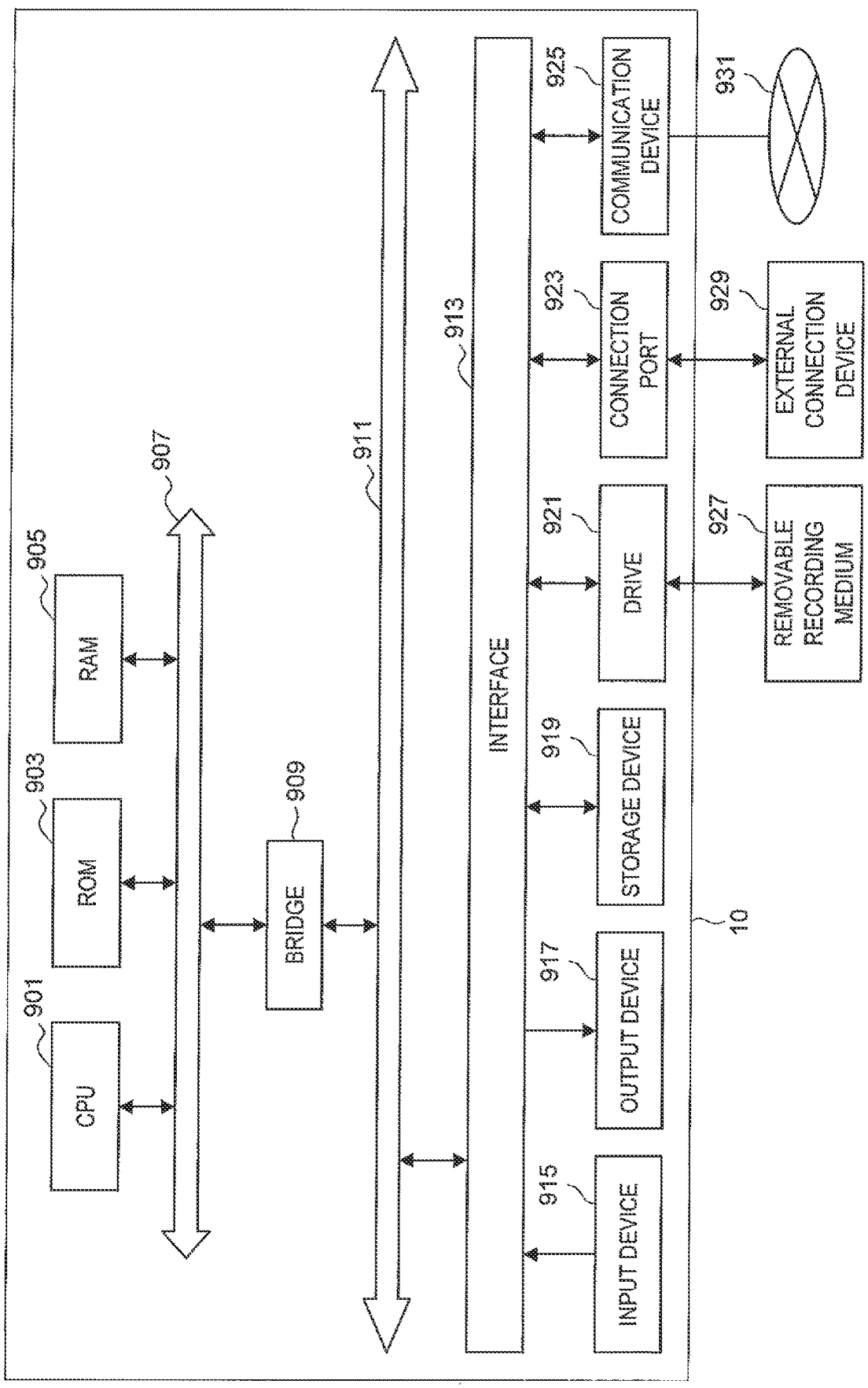
FIG. 14 is a block diagram illustrating the hardware configuration of the information processing apparatus according to the first embodiment.

Next, the hardware configuration of the information processing apparatus 10 according to each embodiment of the present invention will be described in detail with reference to FIG. 14. FIG. 14 is a block diagram illustrating the hardware configuration of the information processing apparatus 10 according to the present embodiment.

The information processing apparatus 10 mainly includes a CPU 901, a ROM 903, a RAM 905, a host bus 907, a bridge 909, an external bus 911, an interface 913, an input apparatus 915, an output apparatus 917, a storage device 919, a drive 921, a connection port 923, and a communication apparatus 925.

The CPU 901 functions as a processing unit and also as a control unit and controls overall operations or a portion thereof in the information processing apparatus 10 following various programs recorded in the ROM 903, the RAM 905, the storage device 919, or a removable recording medium 927. The ROM 903 stores programs, arithmetic parameters and the like used by the CPU 901. The RAM 905 temporarily stores programs used by the CPU 901 and parameters and the like changing as necessary in execution thereof. These components are mutually connected by the host bus 907 constituted by an internal bus such as a CPU bus.

The host bus 907 is connected to the external bus 911 such as a PCI (Peripheral Component Interconnect/Interface) bus via the bridge 909.

The input apparatus 915 is an operation means for operation by the user such as a mouse, keyboard, touch panel, button, switch, and lever. The input apparatus 915 may also be a remote control means (a so-called remocon) using, for example, infrared rays or other radio waves, or an externally connected device 929 such as a mobile phone and PDA supporting operations of the information processing apparatus 10. Further, the input apparatus 915 includes, for example, an input control circuit that generates an input signal based on information input by the user using the above operation means and outputs the input signal to the CPU 901. By operating the input apparatus 915, the user of the information processing apparatus 10 can input various kinds of data into the information processing apparatus 10 and instruct the information processing apparatus 10 to perform processing operations.

The output apparatus 917 includes, for example, a display device such as a CRT display device, liquid crystal display device, plasma display device, EL display device, and lamp, a sound output apparatus such as a speaker and headphone, and a device capable of notifying the user of acquired information visually or auditorily such as a printer device, mobile phone, and facsimile. The output apparatus 917 outputs, for example, results obtained by various kinds of processing performed by the information processing apparatus 10. More specifically, a display device displays results obtained by various kinds of processing performed by the information processing apparatus 10 as text or images. A sound output apparatus, on the other hand, converts an audio signal including reproduced sound data and acoustic data into an analog signal and outputs the analog signal.

The storage device 919 is a device for data storage constituted as an example of the storage unit of the information processing apparatus 10 and includes, for example, a magnetic storage unit device such as an HDD (Hard Disk Drive), semiconductor storage device, optical storage device, and magneto-optical storage device. The storage device 919 stores programs executed by the CPU 910, various kinds of data, and acoustic signal data and image signal data acquired from outside.

The drive 921 is a reader/writer for recording medium and is installed in the information processing apparatus 10 internally or externally. The drive 921 reads out information recorded in the removable recording medium 927 such as an inserted magnetic disk, optical disk, magneto-optical disk, and semiconductor memory and outputs the information to the RAM 905. The drive 921 can also write a record into the removable recording medium 927 such as an inserted magnetic disk, optical disk, magneto-optical disk, and semiconductor memory. The removable recording medium 927 is, for example, a DVD medium, HD-DVD medium, Blu-ray medium, CompactFlash (CF) (registered trademark), memory stick, or SD memory card (Secure Digital memory card). The removable recording medium 927 may also be, for example, an IC card (Integrated Circuit card) or electronic device in which a non-contact IC chip is mounted.

The connection port 923 is a port for directly connecting a device to the information processing apparatus 10, for example, a USB (Universal Serial Bus) port, IEEE1394 port such as i. Link, an SCSI (Small Computer System Interface) port, RS-232C port, optical audio terminal, and an HDMI (High-Definition Multimedia Interface) port. By connecting the externally connected device 929 to the connection port 923, the information processing apparatus 10 directly acquires various kinds of data such as acoustic signal data and image signal data from the externally connected device 929 or provides various kinds of data such as acoustic signal data and image signal data to the externally connected device 929.

The communication apparatus 925 is a communication interface constituted by a communication device or the like for connecting, for example, to a communication network 931. The communication apparatus 925 may be a wire or wireless LAN (Local Area Network), Bluetooth, communication card for WUSB (Wireless USB), router for optical communication, router for ADSL (Asymmetric Digital Subscriber Line), or modem for various kinds of communication. The communication apparatus 925 can, for example, transmit and receive signals and the like according to a predetermined protocol such as TCP/IP to/from the Internet or other communication devices. The communication network 931 connected by the communication apparatus 925 includes a network or the like connected by wire or by radio and may be, for example, the Internet, a home LAN, infrared-ray communication, radio wave communication, or satellite communication.

In the foregoing, an example of the hardware configuration that can realize functions of the information processing apparatus 10 of each embodiment of the present invention has been shown. Each of the above components may be constituted by using general-purpose members or by hardware specialized for the function of each component. Therefore, the hardware configuration to be used can be changed in accordance with the technical level when the present embodiment is carried out if necessary.

Since the hardware configuration of the content management server 20 and the renderer apparatus 30 is substantially the same as that of the information processing apparatus 10, a description thereof is omitted.

It should be understood by those skilled in the art that various modifications, combinations, sub-combinations and alterations may occur depending on design requirements and other factors insofar as they are within the scope of the appended claims or the equivalents thereof.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:
1. An information processing method comprising:
acquiring content information;
generating a content list based on the content information;
transmitting in response to a user selection of a reproduction device from a list of at least one candidate reproduction device and at least one other device capable of reproducing a first content, a request to reproduce the first content based on the user selection of the reproduction device;
reproducing the first content;

displaying information of the at least one other device capable of reproducing the first content to switch the reproduction device to the at least one other device;

transmitting a request to reproduce the first content at a selected device of the at least one other device based on a user selection of the selected device; and displaying, at a time during reproduction of the first content at the selected device, a thumbnail image and metadata corresponding to the first content, the metadata comprising at least one of a genre or a channel.

2. The method of claim 1, further comprising:

transmitting, to a server, information indicating a reproducing point of the first content to cause the first content to be reproduced at the selected device according to the reproducing point.

3. The method of claim 1, further comprising:

displaying a window identifying the selected device in response to a user operation carried out while the selected device reproduces the first content.

4. The method of claim 1, further comprising:

displaying an icon of the selected device, wherein the icon is displayed in a window.

5. The method of claim 1, wherein information about the selected device which reproduces the first content is displayed with the thumbnail image while the selected device reproduces the first content.

6. The method according to claim 1, wherein the content list includes information indicating content category and a plurality of contents, the plurality of contents being arranged based on respective timings at which the plurality of contents was generated, and wherein the contents in the list are scrollable.

7. The method according to claim 1, further comprising:

acquiring the thumbnail image and the metadata corresponding to the first content being reproduced by the selected device, and reproducing the thumbnail image and the metadata while the selected device reproduces the first content.

8. The method according to claim 1, further comprising:

displaying a command window including a command to reproduce the first content by the selected device.

9. A non-transitory recording medium configured to store a program executable by a computer, the program comprising:

acquiring content information;

generating a content list based on the content information;

transmitting in response to a user selection of a reproduction device from a list of at least one candidate reproduction device and at least one other device capable of reproducing a first content, a request to reproduce the first content based on the user selection of the reproduction device;

reproducing the first content;

displaying information of the at least one other device capable of reproducing the first content to switch the reproduction device to the at least one other device;

transmitting a request to reproduce the first content at a selected device of the at least one other device based on a user selection of the selected device; and displaying, at a time during reproduction of the first content at the selected device, a thumbnail image and metadata corresponding to the first content, the metadata comprising at least one of a genre or a channel.

10. An information processing apparatus comprising:

an input interface configured to receive a user operation; and circuitry configured for:

acquiring content information;

generating a content list based on the content information;

transmitting in response to a user selection of a reproduction device from a list of at least one candidate reproduction device and at least one other device capable of reproducing a first content, a request to reproduce the first content based on the user selection of the reproduction device received via the input interface;

reproducing the first content;

displaying information of the at least one other device capable of reproducing the first content to switch the reproduction device to the at least one other device;

transmitting a request to reproduce the first content at a selected device of the at least one other device based on a user selection of the selected device received via the input interface; and displaying, at a time during reproduction of the first content at the selected device, a thumbnail image and metadata corresponding to the first content, the metadata comprising at least one of a genre or a channel.

11. The apparatus according to claim 10, wherein the circuitry is configured for transmitting, to a server, information indicating a reproducing point of the first content to cause the first content to be reproduced at the selected device according to the reproducing point.

12. The apparatus according to claim 10, wherein the circuitry is configured for, in response to a user operation carried out while the selected device reproduces the first content, displaying a window identifying the selected device.

13. The apparatus according to claim 10, wherein the circuitry is configured for displaying an icon of the selected device, and wherein the icon is displayed in a window.

14. The apparatus according to claim 10, wherein information about the selected device which reproduces the first content is displayed with the thumbnail image while the selected device reproduces the first content.

15. The apparatus according to claim 10, wherein the content list includes information indicating content category and a plurality of contents, the plurality of contents being arranged based on respective timings at which the plurality of contents was generated, and wherein the contents in the list are scrollable.

16. The apparatus according to claim 10, wherein the circuitry is configured for acquiring the thumbnail image and the metadata corresponding to the first content being reproduced by the selected device, and reproducing the thumbnail image and the metadata while the selected device reproduces the first content.

17. The apparatus according to claim 10, wherein the circuitry is configured for displaying a command window including a command to reproduce the first content by the selected device.

* * * * *